United States Patent [19]

Sezan et al.

[11] Patent Number: 5,124,913
[45] Date of Patent: Jun. 23, 1992

[54] RULE-BASED TECHNIQUE TO AUTOMATICALLY DETERMINE THE FINAL SCAN GAIN IN STORAGE PHOSPHOR RADIOGRAPHY

[75] Inventors: Muhammed I. Sezan, Rochester; Ralph Schaetzing, Pittsford, both of N.Y.

[73] Assignee: Eastman Kodak Co., Rochester, N.Y.

[21] Appl. No.: 451,916

[22] Filed: Dec. 18, 1989

[51] Int. Cl.$^5$ ............................................. G06F 15/00
[52] U.S. Cl. ............................... 364/413.13; 250/327.2; 250/484.1
[58] Field of Search .................... 364/413.13; 250/327.2 P, 327.2 A, 327.2 B, 327.2 C, 327.2 D, 327.2 E, 327.2 F, 327.2 G, 327.2 L, 484.1 R, 484.1 B

[56] References Cited

U.S. PATENT DOCUMENTS

| | | | |
|---|---|---|---|
| 4,638,162 | 1/1987 | Tanaka et al. | 250/327.2 |
| 4,652,999 | 3/1987 | Higashi et al. | 364/414 |
| 4,682,028 | 7/1987 | Tanaka et al. | 250/327.2 |
| 4,731,863 | 3/1988 | Sezan et al. | 382/51 |
| 4,950,895 | 8/1990 | Reinfelder | 250/484.1 B |
| 4,955,067 | 9/1990 | Shimura | 250/327.3 |
| 5,046,147 | 9/1991 | Funahashi et al. | 250/327.2 |

FOREIGN PATENT DOCUMENTS 0181518 5/1986 European Pat. Off. .
0285174 10/1988 European Pat. Off. .

Primary Examiner—Dale M. Shaw
Assistant Examiner—Laura Brutman
Attorney, Agent, or Firm—William F. Noval

[57] ABSTRACT

In storage phosphor radiography, a portion of the x-ray energy transmitted through the subject is absorbed by a storage phosphor plate. When stimulated by visible light of the right wavelength, the phosphor plate emits light (at another wavelength) in proportion to the absorbed energy. To obtain the radiographic image, the plate can be scanned in a raster fashion and the emitted light can be photoelectrically detected. The detected signal is then amplified, digitized, processed and finally printed on film, or displayed on a cathode ray tube (CRT). Setting the amplification gain of this scanning process, the so-called final scan (or final read-out) gain, is of interest in maximizing the information extracted from the phosphor. One method of setting the final scan gain invokes the use of a preliminary read-out (pre-scan). A pre-scan can be conducted on the phosphor plate by use of a stimulating ray having a stimulating energy lower than the stimulating energy in the final scan. The present invention provides a technique that uses the pre-scan image histogram to automatically determine the final scan gain in storage phosphor radiography.

9 Claims, 6 Drawing Sheets

RULE-BASED TECHNIQUE TO AUTOMATICALLY DETERMINE THE FINAL SCAN GAIN IN STORAGE PHOSPHOR RADIOGRAPHY

TECHNICAL FIELD

This invention relates to a method of automatically determining the image read-out conditions in storage phosphor radiography systems. The method is based on the histogram of a preliminary image (pre-scan image), read out with a low power stimulating ray prior to the final scan.

BACKGROUND ART

In storage phosphor radiography systems, a storage phosphor is exposed to radiation, to produce a latent image in the storage phosphor. Subsequently, the storage phosphor is scan-simulated to release the latent image in the form of detectable radiation. One of the problems associated with storage phosphor radiography is to determine the intensity of stimulation required to produce an optimum read-out of the storage phosphor. The optimum stimulation intensity depends upon the range of energies stored in the phosphor. To this end, it has been proposed to conduct a preliminary scan-stimulation at low intensity to determine the range of energies stored in the storage phosphor. A final read-out scan-stimulation is then performed based on the results obtained from the preliminary read-out. The intensity of the final read-out scan is also referred to as final scan "gain". See for example European Patent application EP 00778677 A3, published Apr. 27, 1983 Suzuki and Horikawa, where they suggest the use of a preliminary scan as a means of determining the final scan and image processing conditions. Although they proposed storage phosphor radiography systems employing manual and automatic control units that utilize the pre-scan information to determine the final scan conditions, they did not disclose the details of how these units work.

In U.S. Pat. No. 4,682,029 issued Jul. 21, 1987 to Tanaka et al., they used the pre-scan image histogram to determine the minimum ($S_{min}$), and the maximum ($S_{max}$) signal levels that correspond to the "useful" image information. The final scan gain was determined such that ($S_{min}$) and ($S_{max}$) would become respectively the the signal levels $Q_{min}$ and $Q_{max}$. At the output, predetermined transformation mapped the signal within the range [$Q_{min}$, $Q_{max}$] to the desired output density range [$D_{min}$, $D_{max}$]. In this manner, the useful image information was expressed within a predetermined range at the output. This technique used a "percent rule" to determine $S_{min}$ and $S_{max}$ from the pre-scan image histogram. The quantity $S_{max}$ was determined from a gray level that was occupied by 0.1 to 2.0% of the total number of picture elements and $S_{min}$ was determined from a gray level that was occupied by 0.05 to 1.0% of the total number of picture elements. The major drawback of this technique is that many gray levels may have the same relative percent population. No rule was disclosed to choose among the multiple possibilities.

In European patent application EP 0145982 A1, published Jun. 26, 1985, Tanaka et al. used a slightly different but equivalent perspective in considering the problem. They emphasized the automatic control of a scale factor introduced in the analog-to-digital (A/D) converter. That is, the final scan gain and the scaling, followed by A/D conversion, constituted the final scan conditions. As in U.S. Pat. No. 4,682,028 cited above, the pre-scan histogram was used to determine $S_{min}$ and $S_{max}$. The scale factor was determined from the difference ($S_{max} - S_{min}$). In cases where the spatial extent of the radiation exposure field is limited to a certain anatomical structure (i.e., collimated X-rays), the value $S_{min}$ is determined mainly by the scattered radiation. This value is smaller than that obtained within the image portion of the radiation exposure field. As a result, the image contrast may decrease if this fact is not taken into consideration in determining the scale factor. In order to alleviate such detrimental effects, Tanaka et al. proposed a technique that required the computation of the histogram ($h_2$) of the pre-scan data obtained from a sub-region of the storage phosphor plate in addition to the histogram ($h_1$) of the data obtained from the entire storage phosphor plate (sub-region area normally occupied 20% to 80% of the total plate area). The quantities $S_{min,1}$, $S_{max,1}$ and $S_{min,2}$, $S_{max,2}$ were obtained from $h_1$ and $h_2$, respectively. (Usually, $S_{min,1} < S_{min,2}$ and $S_{max,1} = S_{max,2} = S_{max}$.) Tanaka et al. proposed a method to compute a value of $S_{min}$ from $S_{min,1}$ and $S_{min,2}$, that would be used to determine the scale factor.

In European patent application EP 0154880 A2, published Sep. 18, 1985 by Tanaka et al., the pre-scan data were collected only from selected sub-regions of the phosphor plate. A characteristic value, $S_{ch}$, was calculated from the mean values of the gray levels within these sub-regions. The final scan gain was determined such that $S_{ch}$ would become the gray level $Q_{av}$ at the final scan. In the predetermined output transformation, the quantity $Q_{av}$ was mapped to a desirable output density level $D_{av}$. The major disadvantage of this technique is that the location of the sub-regions that are used to collect pre-scan data are exam-, and possibly image-dependent.

In U.S. Pat. No. 4,652,999 issued Mar. 24, 1987, Higashi et al. proposed a configuration where the final scan gain and the image processing conditions were determined automatically from the pre-scan information. The so-called "automatic sensitivity adjusting function" (ASAF) determined the final scan gain based on the exam type and image recording conditions (e.g., chest exam and lung field magnification). The final scan gain was determined such that the image information presented to the output station was within a predetermined range [$Q_{min}$, $Q_{max}$], which was mapped to some predetermined density range [$D_{min}$, $D_{max}$] at the output. But, a desired $D_{max}$ may have been specified for the lung field only rather than for the entire image. In that case, the lung field can have the desired output dynamic range only if the x-rays were coned (collimated) onto the lung field (lung field magnification image). Higashi et al. addressed this problem by proposing a "secondary automatic gradation" unit which would ensure that the structure of interest, rather than the entire image, had the desired dynamic range for varying image recording conditions. This control unit was provided with the recording conditions and the value at the output of the ASAF unit. The working principles of the ASAF unit for determining the final scan gain were not disclosed.

As further experience with storage phosphor imaging systems has been gained, it has become apparent that further improvements in methods for adjusting the final read-out conditions based on a preliminary read-out are needed.

Another problem that has been discovered as experience has been gained is that unsatisfactory exposures are not discovered until the final image is read out, processed and displayed. This whole process can consume a good deal of computer time that is wasted if the image must be re-taken.

DISCLOSURE OF THE INVENTION

It is therefore the object of the present invention to provide an improved method for automatically determining the read-out conditions in a storage phosphor radiography system.

In the method according to this invention, peaks (or group of peaks, called clusters) that correspond to major anatomical structures and the background portion (if any) of the pre-scan image are detected. For example, FIG. 1 shows a histogram having 3 peaks 10, 12 and 14, forming a cluster 16. A cluster is composed of $j (j=1,2,\ldots)$ peaks and reduces to a peak for $j=1$. In what follows, we use the terms 'peak' and 'cluster' interchangeably. The final scan gain is then determined such that the peaks are moved to desired gray level (or code value) locations in the final scan. By placing the peaks at desired gray level locations in the final scan, the associated anatomical structures will be at the desired gray levels. The desired locations depend on the exam type and on the image recording conditions. In general, the main consideration in determining the final scan gain is to be able to utilize effectively the available range of gray levels by using a gain as high as possible. At the same time, the gain should not be so high to cause useful image information to saturate at the maximum gray level (in general, only the background portion of the image is allowed to saturate at the maximum gray level).

One advantage of the proposed method over the previous pre-scan histogram based methods is the detection of individual histogram cluster supports instead of the entire histogram support, $[S_{min}, S_{max}]$. Since histogram clusters, in general, correspond to major anatomical structures, this technique is more flexible than the others for maintaining the major structures at desired gray levels in the final image. Furthermore, the entire histogram support as used in the prior art methods, determined from the minimum and the maximum gray levels ($S_{min}, S_{max}$) present in the image, may not correctly represent the useful image information range. In particular, $S_{min}$ may underestimate the true minimum, $S_{max}$, on the other hand, may overestimate the maximum value of the useful image information range. This can be because of the existence of insignificantly populated higher gray levels isolated from the major population range, or because of background peaks. The former situation is illustrated in FIG. 2 which illustrates a pre-scan histogram with isolated levels 18. The existence of such levels may be due to (1) nonuniformities in the x-ray beam, (2) x-ray noise, (3) x-ray scatter, (4) phosphor plate structure noise, and (5) scanner noise. In FIG. 2, the final scan gain based on $S_{max}$ would not fully utilize the allowable dynamic range of gray levels (e.g., $[0, 2^B-1]$ for a B-bit digital radiography system). The gray level $e_2$ in FIG. 2 is a better estimate for the maximum of the useful image information range. The method according to the present invention estimates the cluster supports $[s_1, e_1]$ and $[s_2, e_2]$, and bases the final scan gain on the value $e_2$.

According to one aspect of the present invention, the final scan gain in a storage phosphor radiography system is adjusted by: performing a preliminary scan read out at low intensity; generating a histogram from the results of the preliminary scan read-out; locating clusters of peaks in the histogram; determining the peaks, clusters representing structures of interest; and adjusting the final scan gain such that the clusters of peaks representing anatomical structures of interest are located at desired gray levels in the output image, depending on exam type and image recording conditions.

According to another aspect of the invention, a gain factor g is computed from the histogram data, and is applied on a pixel by pixel basis to the pre-scan image to produce a quality control image. The quality control image display on a monitor prior to final read-out of the image so that an operator can order a re-take of the image if the quality is unacceptable.

MODES OF CARRYING OUT THE INVENTION

Figure 1:
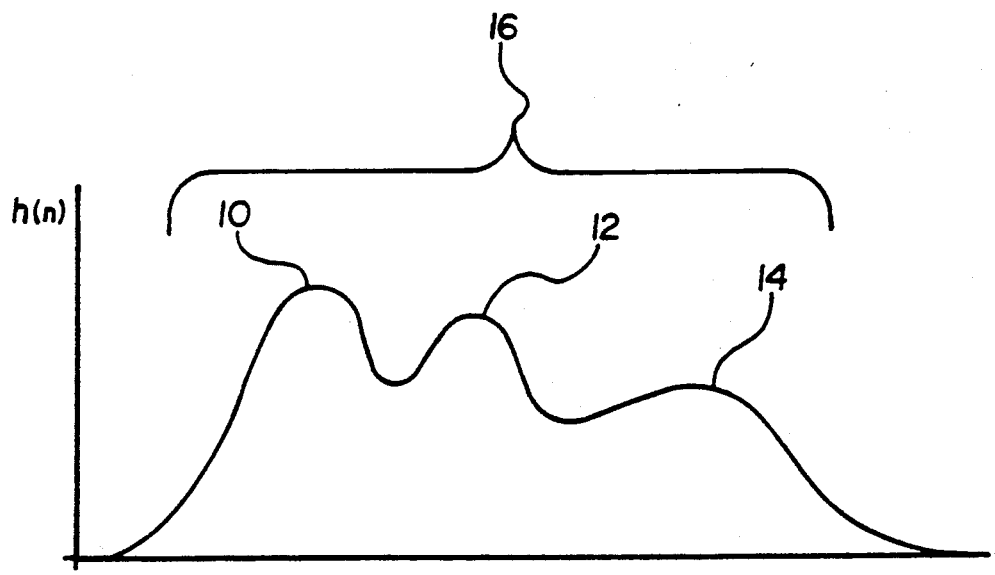
FIG. 1 is a histogram illustrating peaks and clusters.
Figure 2:
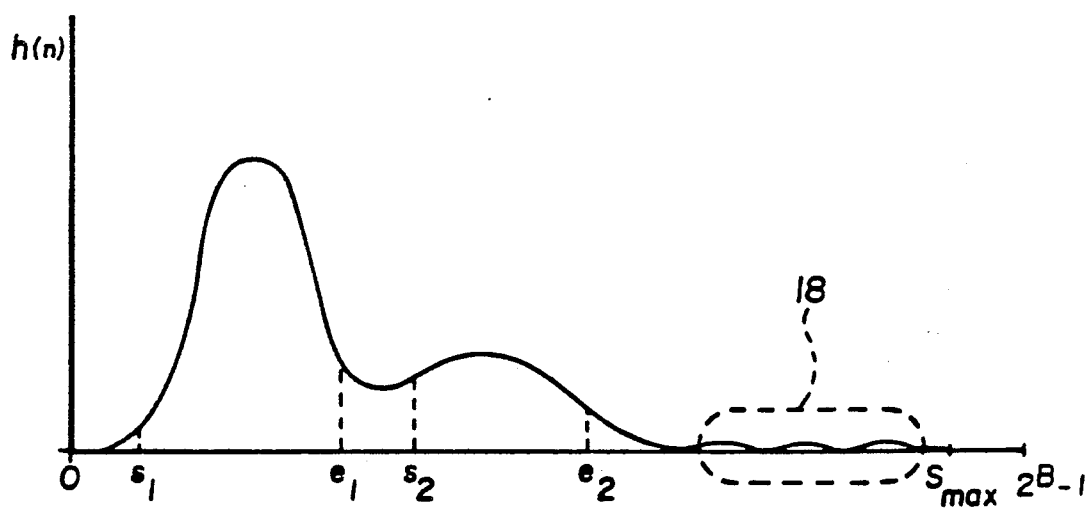
FIG. 2 is a histogram illustrating insignificantly populated isolated levels.
Figure 3:
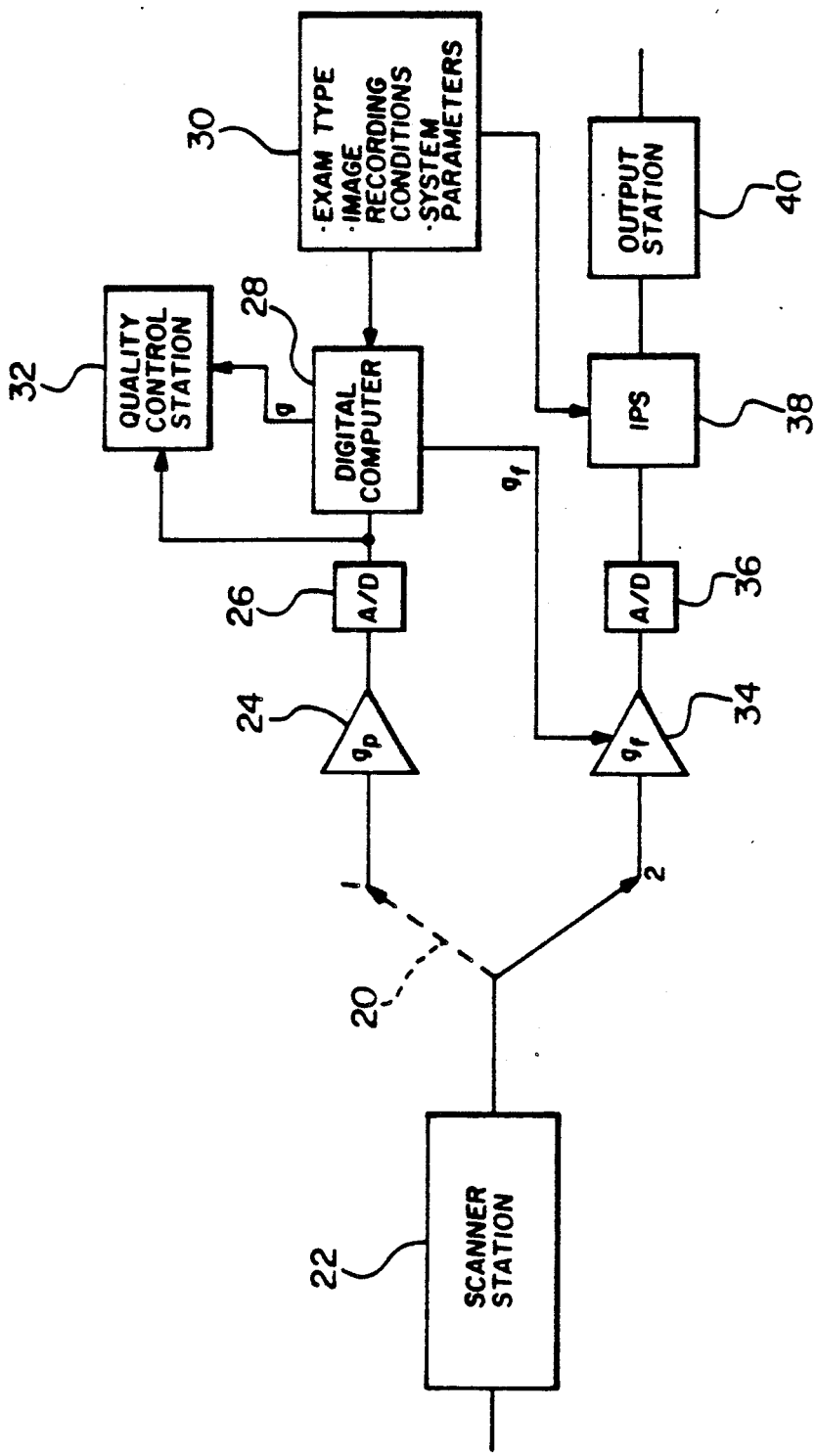
FIG. 3 is a block diagram of a storage phosphor radiography system where the final-scan gain is determined by the method of the present invention.

FIG. 3 is a schematic diagram illustrating a storage phosphor radiography system for implementing the final scan gain determination method of the present invention. A switch 20 is at position 1 when a pre-scan is conducted at the scanner station 22. The pre-scan data are amplified in an amplifier 24 ($g_p$), digitized in an A/D converter 26 and fed to a digital computer 28 that performs the gain setting algorithm. Exam type, image recording condition and system parameters are provided to the computer and hence the gain setting algorithm via a user interface 30. The gain setting algorithm determines a gain factor g which is then scaled by system parameters to determine the final scan gain $g_f$. The gain factor g is used in computing a "quality control image" (QCI) displayed on a monitor at a quality control station 32, prior to the final read-out. The QCI is computed by pixel-by-pixel scaling of the pre-scan image by the gain factor g. An operator inspects QCI for motion artifacts or patient misplacement. In the case of severe motion artifacts or misplacements, the operator may call for a re-take, otherwise the patient is released prior to final read-out. The final read-out is conducted using a higher laser power (and possibly higher resolution) at the scanner station 22 with the switch 20 at position 2. The gain of the final scan amplifier 34 is set to $g_f$ where $$g_f = g \frac{g_p}{g_l}, \tag{1}$$

and where $g_l$ is the gain introduced by the increase laser power during the final scan. The final scan data are digitized in an A/D converter 36 and supplied to an image processing station (IPS) 38. The image processing station 38 (IPS) is a digital computer that is programmed to implement various image processing algorithms. The IPS can incorporate tone-scale transformations, unsharp marking, whose parameters can be automatically configured. The final image, or multiple images processed differently, are printed on film, or displayed on CRT, or recorded on an archiving system at the output station, or encoded and transmitted to a remote site at an output station 40.

The method for setting the final scan gain according to the invention includes the following:

I. Generate the histogram, h(n), and the cumulative distribution function (CDF) (or normalized cumulative histogram), c(n), of the pre-scan image;

II. Detect the peaks (or clusters) in the histogram h(n);

III. Based on a set of "selection rules", determine one major set of peaks or clusters representing structures of interest that are to be used in gain setting;

IV. On the basis of exam-dependent rules and image recording condition, determine the gain factor g;

V. Using the system parameters, such as the pre-scan gain, the laser power, photomultiplier tube settings, etc., and the gain factor g computed in Step IV, compute the electronic gain $g_f$ that is to be used in the final scan.

Figure 4:
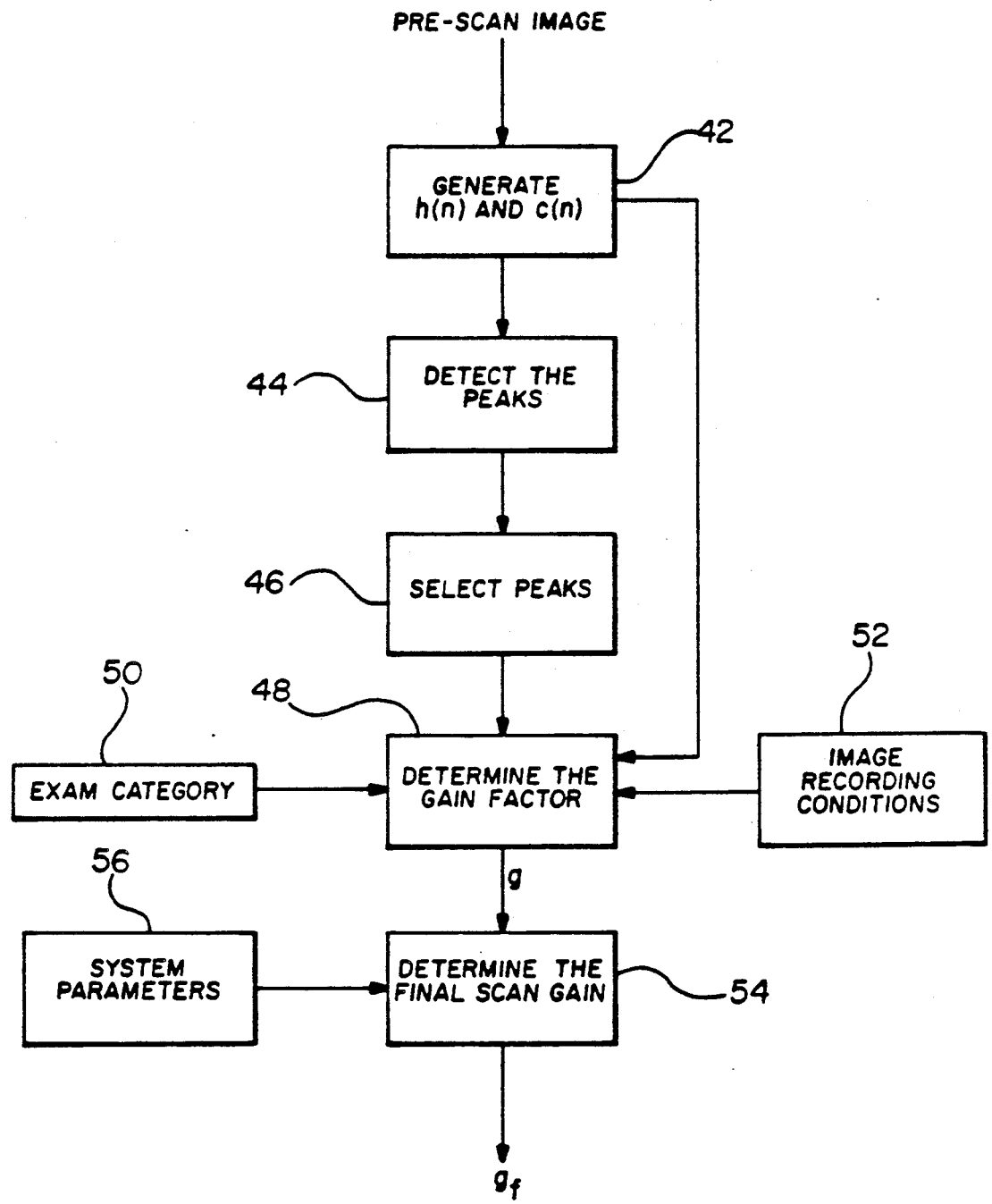
FIG. 4 is a flowchart showing the final scan gain setting method according to the present invention.

A flowchart showing the steps employed in the gain setting method is illustrated in FIG. 4. We now discuss each of these five steps.

STEP I (42): We denote the histogram of the pre-scan image by h(n), $n = 0, 1, \ldots, 2^B - 1$, where B is the number of bits per pixel used to represent the image. Then, CDF, c(n) is computed as $$c(n) = (1/M) \sum_{l=0}^{n} h(l), \quad n = 0, 1, \ldots, 2^B - 1, \quad (2)$$

where M denotes the total number of pixels in the image.

STEP II (44): Peaks of the pre-scan histogram, h(n), are detected, for example by using the peak detection method disclosed in U.S. Pat. No. 4,731,863 issued Mar. 15, 1988 to Sezan et al. which is incorporated herein by reference.

In the peak detection algorithm, a peak detection function is generated from CDF. First, c(n) is smoothed by convolving with a uniform rectangular window $w_N(n)$ to produce a smoothed CDF, $\bar{c}_N(n)$,:

$$\bar{c}_N(n) = c(n) * w_N(n) \quad (3)$$

where the uniform rectangular window is such that $$w_N(n) + \begin{cases} 1/N, & -(N-1)/2 \leq n \leq (N-1)/2 \\ 0, & \text{otherwise} \end{cases} \quad (4)$$

and N is assumed to be odd. The smoothed CDF, $\bar{c}_N(n)$, is subtracted from c(n) to generate the peak detection function $r_n$:

$$r_N(n) = c(n) - \bar{c}_N(n). \quad (5)$$

The following principles are applied to the peak detection function $r_N$ to estimate the start and end points of the peaks.

(i) A zero-crossing of the detection signal to negative values (henceforth, negative crossover) indicates the start of a peak. The gray level at which the negative crossover occurs is defined to be the estimate of a start point. For the ith peak, this gray level is denoted by $s_i$. Similarly, the next negative crossover at the gray level $s_{i+1}$ estimates the start of the next peak.

(ii) The gray level between two successive negative crossovers at which the detection signal attains its local maximum is defined to be the estimate of the end point of the peak. For the ith peak, this gray level is denoted by $e_i$. The peaks are denoted by intervals defined by their start and end points, i.e., $[s_i, e_i]$.

The length of the window, N, determines the sensitivity of peak detection. The parameter N is therefore referred to as the 'peak detection sensitivity parameter'. As the value of N is decreased, the peak-detection sensitivity increases. To detect peaks accurately, the above procedure (Step II) is iterated twice with two different window sizes, $N = N_1$ and $N = N_2 (N_1 > N_2)$, and two sets of peaks are obtained:

$$A_1 = \{[s_i^1, e_i^1] : i = 1, 2, \ldots, I_1\} (N = N_1)$$

$$A_2 = \{[s_i^2, e_i^2] : i = 1, 2, \ldots, I_2\} (N = N_2) \quad (6)$$

where $I_2 \geq I_1$ because the sensitivity of the peak detection increases with decreasing window size. The other parameters in the peak detection algorithm are set to the values disclosed in U.S. Pat. No. 4,731,863.

STEP III (46): The purpose of this step is to select from both $A_1$ and $A_2$ a final set, A, of peaks (so-called "major" peaks) that will be used in gain calculation. The selection is performed on the basis of a number of rules. The rules determine the peaks (or groups of peaks) from $A_1$ and $A_2$ that significantly overlap with each other, and take only one representative peak (or peak cluster) into consideration in gain calculation.

The $A_2$-intervals (or equivalently the $A_2$-peaks), i.e., $[s_i^2, e_i^2]$'s may overlap with the $A_1$-intervals (or equivalently the $A_1$-peaks), i.e., $[s_i^1, e_i^1]$'s. If the relative population of pixels contained in the overlap exceeds a predetermined value then the overlap is said to be "significant". Nonoverlapping peaks, or insignificantly overlapping peaks are called "independent" peaks. The overlapping and the independent peaks are determined by the overlap detection procedure described in U.S. Pat. No. 4,731,863. To summarize, the set A of the major peaks are formed via the following rules (R1-R2):

R1. An $A_1$-peak qualifies for the set A if
 (i) it is an independent peak, or
 (ii) it is not an independent peak but the total number of the significant overlaps is less than t, where t is an empirically predetermined parameter. (If an $A_2$ peak overlaps significantly with an $A_1$-peak then the overlap is said to be a 'major overlap' if the ratio of the number of pixels contained in the overlap to the total number of pixels contained in the $A_1$-peak exceeds the value $R_{maj}$.)

R2. An $A_2$-peak qualifies for the set A if
 (i) it is an independent peak, or (ii) it is not independent, but its overlap with the $A_1$-peak is a major overlap and the total number of $A_2$-peaks that have major overlaps with the $A_1$ peak is at least t, or (iii) it is not independent and its overlap with the $A_1$-peak is not a major one, but here exist at least t other $A_2$-peaks with major overlaps with that $A_1$-peak. In this case, adjacent peaks that do not have major overlaps with the $A_1$-peak are combined into single peaks.

The final set A can be defined as $$A = \{[s_i, e_i]: i = 1, 2, \ldots, I\} \quad (7)$$

The overlap detection algorithm is explained in detail in U.S. Pat. No. 4,731,863. The recommended values for the parameters of the overlap detection algorithm in the present invention are: $N_1 = 2161$; $NN_2 = 541$; $R_{maj} = 0.80$; and $t = 2$. STEP IV (48): Given the major set of peaks determined in the previous step, the exam type (50), and the image recording condition (50), the gain factor is calculated using a rule base. The image recording condition (52) may be either (i) x-rays are collimated, or (ii) x-rays are not collimated. The exam types are classified into three major categories. That is, each incoming exam is classified into one of the following catagories: (i) chest, (ii) extremity, and (iii) abdomen. Each category has its own set of rules. These rules were determined experimentally from thousands of exams.

In each category, the rule base first determines whether or not the peaks in the final set correspond to an anatomical structure, background or a mixture of the two. Then, the gain factor is calculated with two main objectives: (1) to set the gain high enough such that the available gray level range is fully utilized, and (2) to set the gain low enough such that valuable image information is not saturated at the maximum gray level (in general, only the background portion of the image is allowed to saturate at the maximum gray level). In the following, we provide the rule base for three exam categories.

In our notation, capital letters denote the user-specified (predetermined) parameters. The subscripts denote the exam category, i.e., 'c' for chest, 'e' for extremity, and 'a' for abdomen. The superscripts denote the image recording condition and the modality of the histogram. For instance, $Q_e^{u,c}$ denote the parameter for extremity exams when the x-rays are collimated and the pre-scan histogram is unimodal. We provide recommended values of the user-specified parameters for a 12-bit digital radiography system. These values have been obtained as a result of studying thousands of cases.

CHEST EXAMS

A. The Rule Base

1. IF the histogram is unimodal, THEN the gain is set such that $e_1$ is mapped to gray level (or code value) $Q_c^u$: $g = Q_c^u / e_1$ 2. IF the histogram is not unimodal, THEN
   (a) IF at least a predetermined percentage, P2% of the total number of pixels attain values in the interval $[e_2, q_{max} - 1]$ (where $q_{max}$ denotes the largest gray level present in the pre-scan image), THEN the gain is determined by the following rule: First, the local maximum of the histogram in the interval $[s_2, e_2]$ is determined. Let $m_2$ denote the code value at which the local maximum occurs. Then the interval $[m_2, q_{max} - 1]$ is searched for the smallest code value at which the histogram attains a value less than or equal to $K1h(m_2)$ ($K1 < 1$ is a predetermined coefficient), (b) IF the percentage of pixels that attain values in the interval $[e_2, q_{max} - 1]$ is greater than or equal to a predetermined percentage, P1, but smaller than P2 THEN the previous rule is used with $K2h(m_2)$ ($K1 < K2 < 1$ is a predetermined coefficient), (c) IF the percentage of pixels that attain values in the interval $[e_2, q_{max} - 1]$ is less than P1 THEN
      IF the x-rays are not collimated
         i. IF the histogram is bimodal, THEN
            A. IF the percentage of the total number of pixels that attain the value $q_{max}$ is less than or equal to $P_c\%$, THEN
               (1) IF the slope of the CDF between $e_1$ and $s_2$ is greater than the predetermined threshold $S_c$, THEN the gain is set such that $s_2$ is mapped to code value $Q_c$: $g = Q_c/s_2$.
               (2) IF the slope of the CDF computed between $e_1$ and $s_2$ is less than or equal to the predetermined threshold $S_c$, THEN the gain is set such that a code value between $e_1$ and $s_2$, determined from a convex combination of $e_1$ and $s_2$, i.e., $(L_c)e_1 + (1 - L_c)s_2$, is mapped to code value $Q_c$. ($0 \leq L_c \leq 1$.)
            B. IF the percentage of the total number of pixels that attain the value $q_{max}$ is greater than $P_c\%$, THEN the gain is set such that $e_2$ is mapped to code value $Q_c$: $g = Q_c/e_2$
         ii. IF the histogram is not bimodal, THEN the gain is set such that $e_2$ is mapped to code value $Q_c$: $g = Q_c/e_2$.
      IF the x-rays are collimated, THEN the gain is set as in 2(a).

B. Recommended Values of Parameters $$Q_c^u = \begin{cases} 2250, & \text{antero-posterior } (AP)/\text{postero-anterior } (PA) \text{ exams} \\ & \text{(patient or his back facing the x-ray tube)} \\ 2900, & \text{lateral exams (patient turned sideways).} \end{cases}$$

$$P1 = \begin{cases} 15, & AP/PA \text{ exams} \\ 45, & \text{lateral exams.} \end{cases}$$

$$P2 = \begin{cases} 25, & AP/PA \text{ exams} \\ 55, & \text{lateral exams.} \end{cases}$$

$P_c = 20.0$; $L_c = 0.5$; $Q_c = 4095$ $K1 = 0.01$; $K2 = 0.02$; $S_c = 8 \times 10^{-5}$

EXTREMITY EXAMS

A. The Rule Base

1. IF the histogram is unimodal, THEN
   IF the x-rays are not collimated, THEN the gain is set as $g = Q_e^u/e_1$ provided that not more than $P_e\%$ of the pixels are mapped to the maximum code value of the system (e.g. 4095 in a 12-bits/pixel system) in the final output, ELSE the gain is set such that $g = Q_e^u/e$ where $e$ ($e < e_1$) is determined such that 1% of the pixels are mapped to the maximum code value of the system in the final output.

IF the x-rays are collimated, THEN the gain is set such that $e_1$ is mapped to code value $Q_e^{u,c}$: $g = Q_e^{u,c}/e_1$ 2. IF the histogram is not unimodal, THEN
IF the x-rays are not collimated
   (a) IF the histogram is bimodal, THEN
      i. If the slope of the CDF computed between $e_1$ and $s_2$ is greater than the predetermined threshold $S_e$, THEN the gain is set as $g = Q_e/e_2$ provided that not more than $P_e\%$ of the pixels are mapped to the maximum code value of the system (e.g. 4095 in a 12-bits/pixel system) in the final output, ELSE the gain is set such that $g = Q_e/e$ where $e$ ($e < e_2$) is determined such that 1% of the pixels are mapped to the maximum code value of the system in the final output.
      ii. IF the slope of the CDF computed between $e_1$ and $s_2$ is less than or equal to the predetermined threshold $S_e$, THEN the gain is set such that a code value between $e_1$ and $s_2$, determined from a convex combination of $e_1$ and $s_2$, i.e., $(L_e)e_1 + (1 - L_e)s_2$, is mapped to code value $Q_e$. ($0 \leq L_e \leq 1$.)
   (b) IF the histogram has more than two clusters, THEN
      i. IF the slope of the CDF computed between $e_2$ and $s_3$ is greater than the predetermined threshold $S_e$, THEN the gain is set as $g = Q_e/e_3$ provided that not more than $P_e\%$ of the pixels lie in $[e_3, q_{max} - 1]$, ELSE the gain is set such that the percentage of the pixels that are mapped to the maximum code value of the system in the final output is 1%.
      ii. IF the slope of the CDF computed between $e_2$ and $s_3$ is less than or equal to the predetermined threshold $S_e$, THEN
         A. IF the slope of the CDF computed between $e_1$ and $s_2$ is greater than the predetermined threshold $S_e$, THEN the gain is set such that a code value between $e_2$ and $s_3$, determined from a convex combination of $e_2$ and $s_3$, i.e., $(L_e)e_2 + (1 - L_e)s_3$, is mapped to code value $Q_e$.
         B. IF the slope of the CDF computed between $e_1$ and $s_2$ is less than or equal to the predetermined threshold $S_e$, and the second cluster is closer to the third, THEN
            (1) IF the histogram has three clusters, THEN the gain is set such that a code value between $e_1$ and $s_2$, determined from a convex combination of $e_1$ and $s_2$, i.e., $(L_e)e_1 + (1 - L_e)s_2$, is mapped to code value $Q_e$.
            (2) IF the histogram has four clusters, THEN the gain is set such that $s_3$ is mapped to $Q_e$: $g = Q_e/s_3$.
            (3) IF the histogram has more than four clusters, THEN the gain is set such that $e_3$ is mapped to $Q_e$: $g = Q_e/e_3$.
         C. IF the slope of the CDF computed between $e_1$ and $s_2$ is less than or equal to the predetermined threshold $S_e$, but the second cluster is closer to the first, THEN the gain is set such that a code value between $e_2$ and $s_3$, determined from a convex combination of $e_2$ and $s_3$, i.e., $(L_e)e_2 + (1 - L_e)s_3$, is mapped to code value $Q_e$.

IF the x-rays are collimated, THEN the gain is set such that the end point of the last cluster is mapped to code value $Q_e^c$.

B. Recommended Values of Parameters $Q_e^u = 3500$; $Q_e^{u,c} = 1500$ $Q_e = 4095$; $Q_e^c = 3500$
$S_e = 2.0 \times 10^{-4}$; $P_e = 2.0$; $L_e = 0.4$.

ABDOMEN EXAMS

A. The Rule Base

1. IF the histogram is unimodal, THEN
The gain is set as $g = Q_a^u/e_1$ provided that not more than $P_a\%$ and not less than 0.5% of the pixels are mapped to the maximum code value of the system in the final output, ELSE the gain is set such that $g = Q_a^u/e$ where $e$ is determined such that 0.5% of the pixels are mapped to the maximum code value of the system in the final output.

2. IF the histogram is not unimodal, THEN
IF the x-rays are not collimated
   (a) IF the histogram is bimodal, THEN
      i. IF the slope of the CDF computed between $e_1$ and $s_2$ is greater than the predetermined threshold $S_a$, THEN the gain is set as $g = Q_a^u/e_2$ provided that not more than $P_a\%$ of the pixels are mapped to the maximum code value of the system (e.g. 4095 in a 12-bits/pixel system) in the final output, ELSE the gain is set such that $g = Q_a^u/e$ where $e$ ($e < e_2$) is determined such that 0.5% of the pixels are mapped to the maximum code value of the system in the final output.
      ii. IF the slope of the CDF computed between $e_1$ and $s_2$ is less than or equal to the predetermined threshold $S_a$, THEN the gain is set such that a code value between $e_1$ and $s_2$, determined from a convex combination of $e_1$ and $s_2$, i.e., $(L_a)e_1 + (1 - L_a)s_2$, is mapped to code value $Q_a$. ($0 \leq L_a \leq 1$.)
   (b) IF the histogram has more than two clusters, THEN
      i. IF the slope of the CDF computed between $e_2$ and $s_3$ is greater than the predetermined threshold $S_a$, THEN the gain is set as $g = Q_a^u/e_3$ provided that not more than $P_a\%$ of the pixels lie in $[e_3, q_{max} - 1]$, ELSE the gain is set such that the percentage of the pixels that are mapped to the maximum code value of the system in the final output is 0.5%.
      ii. IF the slope of the CDF computed between $e_2$ and $s_3$ is less than or equal to the predetermined threshold $S_a$, THEN
         A. IF the slope of the CDF computed between $e_1$ and $s_2$ is greater than the predetermined threshold $S_a$, THEN the gain is set such that a code value between $e_2$ and $s_3$, determined from a convex combination of $e_2$ and $s_3$, i.e., $(L_a)e_2 + (1 - L_a)s_3$, is mapped to code value $Q_a$.
         B. IF the slope of the CDF computed between $e_1$ and $s_2$ is less than or equal to the predetermined threshold $S_a$, and the second cluster is closer to the third, THEN the gain is set such that a code value between $e_1$ and $s_2$, determined from a convex combination of $e_1$ and $s_2$, i.e., $(L_a)e_1 + (1 - L_a)s_2$, is mapped to code value $Q_a$.

C. IF the slope of the CDF computed between $e_2$ and $e_3$ is less than or equal to the predetermined threshold $S_a$, but the second cluster is closer to first, THEN the gain is set as $g = Q_a/e_3$ IF the x-rays are collimated, THEN the gain is set such that the end point of the last cluster is mapped to code value $Q_a^c$.

B. Recommended Values of Parameters

In Rules 2(a)(ii) and 2(b)(ii), the coefficients used in forming the convex combinations of peak parameters vary with the slope of the CDF as follows:

$$L_a = \begin{cases} 0.5, & \text{slope} < 4 \times 10^{-5} \\ 0.4, & 4 \times 10^{-5} \leq \text{slope} < 5 \times 10^{-5} \\ 0.3 & 5 \times 10^{-5} \leq \text{slope} < 6 \times 10^{-5} \\ 0.2 & 6 \times 10^{-5} \leq \text{slope} < 1 \times 10^{-4} \\ 0.1 & \text{slope} \leq 1 \times 10^{-4} \end{cases}$$

$P_a = 5.0; \quad S_a = 1.5 \times 10^{-4};$ $Q_a^u = 3500; \quad Q_a = 4095; \quad Q_a^c = 3500$ STEP V (54): The final scan gain $g_f$ is obtained by simply scaling the gain factor g by a coefficient that reflects the system parameters 56, such as the the laser power, photomultiplier tube settings and the pre-scan gain. If we denote the gain introduced by the increase in laser power during the final scan by $g_l$, and the pre-scan gain by $g_p$, then the final scan electronic gain $g_f$ is given by $$g_f = (g_p/g_l)g, \quad (8)$$

where g denotes the gain factor determined in the previous step.

EXAMPLES

Figure 5:
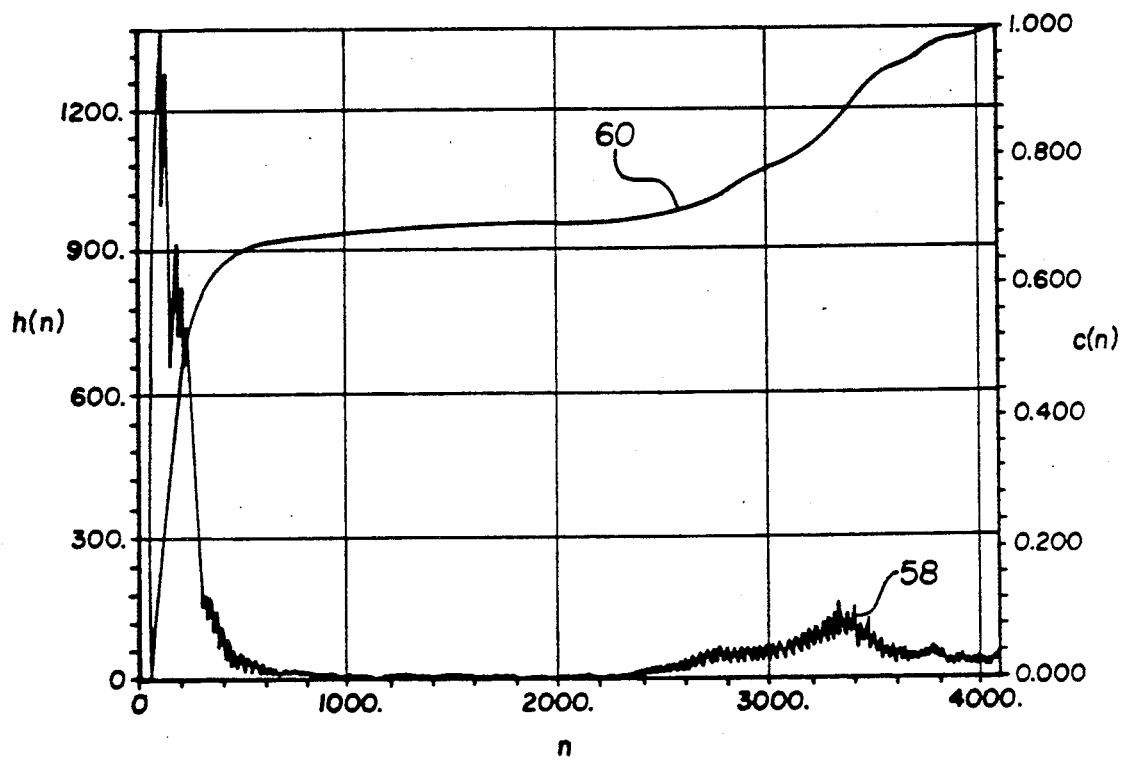
FIG. 5 illustrates a pre-scan histogram of a chest exam.
Figure 6:
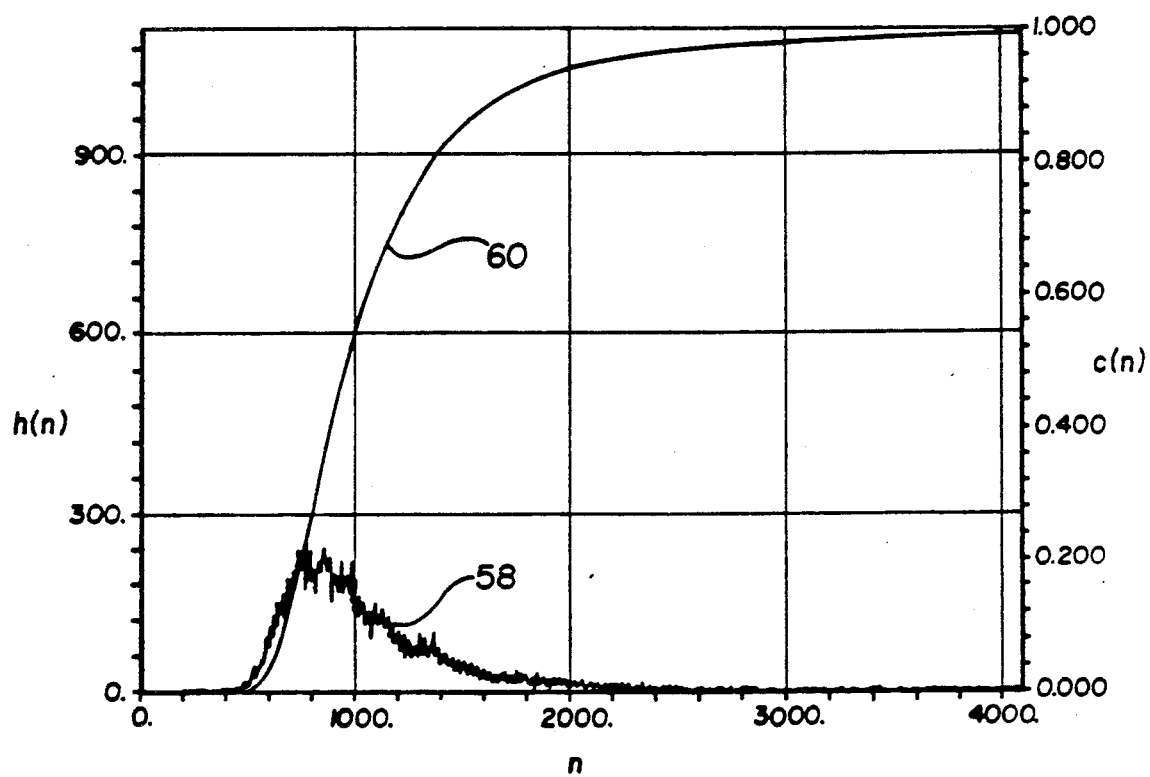
FIG. 6 illustrates a pre-scan histogram of a lumbar spine exam.
Figure 7:
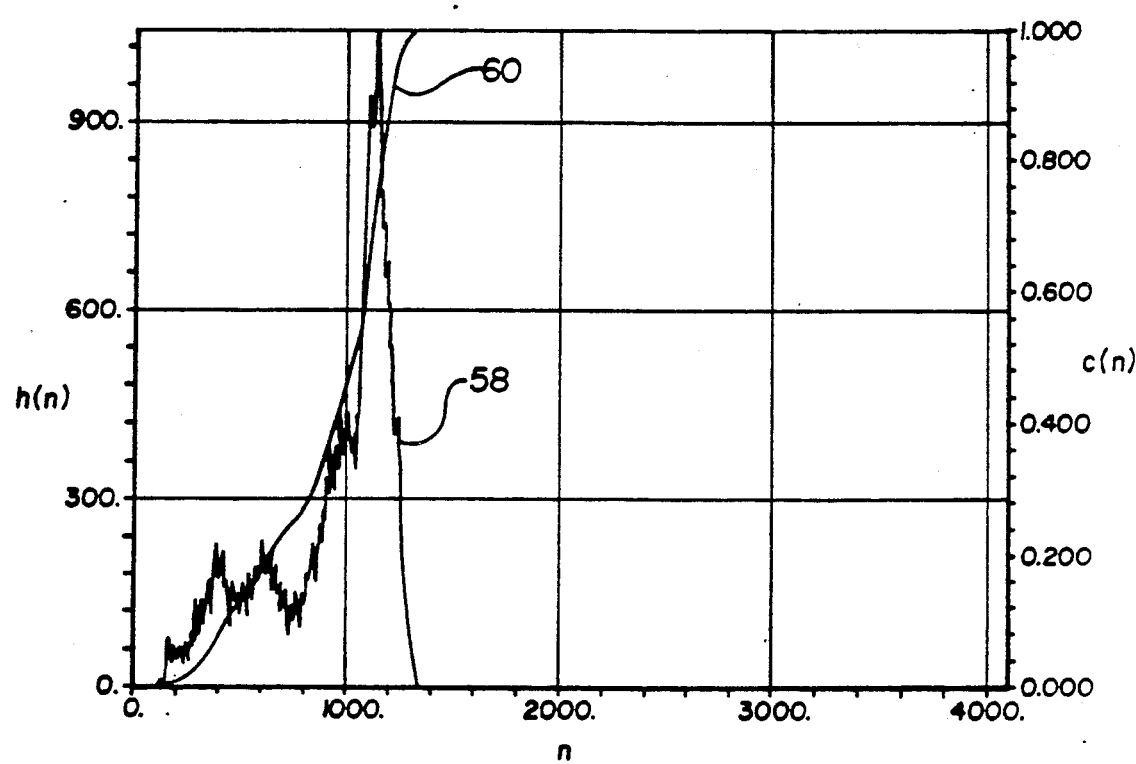
FIG. 7 illustrates a pre-scan histogram of a hands exam.

In the following we present three examples. The corresponding pre-scan image histograms, h(n) 58, and CDFs, c(n) 60, are illustrated in FIGS. 5–7, respectively for three examples. The peak information and the gain factors calculated according to the method of the present invention are given below. These results are obtained by using the recommended values of the parameters noted above.

EXAMPLE NO. 1

Exam Type: Chest (lateral)
Image Recording Condition: x-rays are not collimated
Exam Category Used in Gain Setting: Chest
$A_1 = \{[0,386], [1665,3850]\}$
$A_2 = \{[0,261], [2099,3495]\}$
$A = \{[0,386], [1665,3850]\}$
Rule Used in Gain Setting: CHEST: 2.(c)(i)(A)(2)
Gain Factor(g): 3.99

EXAMPLE NO. 2

Exam Type: Lumbar Spine (AP)
Image Recording Condition: x-rays are not collimated
Exam Category Used in Gain Setting: Abdomen
$A_1 = \{[0,1395]\}$
$A_2 = \{[0,1015]\}$
$A = \{[0,1395]\}$
Rule Used in Gain Setting: ABDOMEN: 1
Gain Factor(g): 1.16

EXAMPLE NO. 3

Exam Type: Hands
Image Recording Condition: x-rays are not collimated
Exam Category Used in Gain Setting: Extremity
$A_1 = \{[0,1279]\}$
$A_2 = \{[0,667], [706,1249]\}$
$A = \{[0,667], [706,1249]\}$
Rule Used in Gain Setting: EXTREMITY: 2.(a)(i)
Gain Factor(g): 3.17

A Fortran program for implementing the gain setting method according to the present invention is included in Appendix A.

APPENDIX A

```
C >>>>> VERSION: 1                         (MARCH 4,1988)
C----------------------------------------------------------------C
C                                                                C
C                     PROGRAM    PITT12                          C
C                                                                C
C----------------------------------------------------------------C
C                                                                C
C         Purpose:  To determine final-scan gain from pre-scan image   C
C                   cumulative distribution function  in  storage     C
C                   phosphor radiography.                        C
C                   The gain factor determined by the program can also C
C                   be used in producing a "quality control" (QC) image.C
C                   The QC image is obtained by scaling the pre-scan   C
C                   image (pixel by pixel) with the gain factor.  C
C                   LESS CONSERVATIVE VERSION OF GAINCDF  MARCH 26/86  C
C                                                                C
C         Author :  M.Ibrahim Sezan                              C
C                   Research Laboratories, Eastman Kodak Company  C
C                   November 19, 1985                            C
C                                                                C
C Modifications:    RULE: EXTREMITY (1) is replaced by rules:    C
C                   EXTREMITY (1.1) and EXTREMITY (1.2)          C
C                   (December 16, 1985)                          C
C                   Subroutine SORT is modified                  C
C                   (December 18, 1985)                          C
C                   RULE: CHEST (2.3.2.b) is modified            C
C                   (December 19, 1985)                          C
C                   ABDOMEN rules are modified                   C
C                   (December 20, 1985)                          C
```

```
C              misc. revisions (GPEAK,CGAIN)                                C
C              (March 26, 1986)                                             C
C              LHS padding on cdf is done by CDF(0)                         C
C              (June  18, 1986)                                             C
C              Rule modification done in GAINCDF (EGAIN)                    C
C              (Aug. 8, 1986) is incorporated.                              C
C              (April 30, 1987)                                             C
C              RULE: CHEST (2.3.2.a) is modified as June 16/87              C
C              modification in Pittsburgh.                                  C
C              LATERAL option is incorporated as in Pittsburgh.             C
C              (Feb. 9, 1988)                                               C
C              Changes in PKFIND per program NEWPEAK (Feb. 9,1988) C
C              cdf values for 'ZERO POPULATION' code values are             C
C              filled in (Feb. 10, 1988)                                    C
C              Revision in GPEAK (Feb. 11, 1988)                            C
C              MCUNI=3000 is used as default for laterals                   C
C              (Feb. 23, 1988)                                              C
C              In RULE CHEST(2.3.2.b), NEF(2) is changed to                 C
C              NSF(2). (Feb. 23, 1988)                                      C
C              RULE CHEST(2.3.2.a.2) is branched out                        C
C              (Feb. 23, 1988)                                              C
C              Modification of Feb. 11/88 change in GPEAK                   C
C              (Feb. 23, 1988)                                              C
C              Grouping the sorted clusters which are 'close' to            C
C              each other in SUBROUTINE SORT (Feb. 29,1988)                 C
C              .....MAJOR OVERHAUL in EGAIN and AGAIN........               C
C              (Previous changes in these routines can be ignored) C
C              (March 4, 1988)                                              C
C              FKOUNT changed to KOUNT in SORT (March 4, 1988)              C
C              PMID modified to convex combination CCVX in CGAIN            C
C              (March 4, 1988)                                              C
C              COMMON/DATA/.. ADDED TO SUBROUTINE HSRCH                     C
C              (OCTOBER 20, 1988)                                           C
C              MCUN1=2900 (FEBRUARY 13, 1989)                               C
C              CLIPPING TAIL PERCENT CRITERIA IS CHANGED FROM               C
C              1 TO 0.5 % IN ABDOMEN (FEBRUARY 13, 1989)                    C
C              ..K1=0.5 FOR SLOPE .LT. 0.75;                                C
C              ..K1=0.4 FOR 0.75.LE. SLOPE .LT.1.25;                        C
C              ..K1=0.3 FOR SLOPE .GE. 1.25                                 C
C              ABDOMEN EXAMS (FEBRUARY, 13 1989)                            C
C              ..K1=0.5 FOR SLOPE .LT.0.4;                                  C
C              ..K1=0.4 FOR 0.4.LE.SLOPE.LT.0.5                             C
C              ..K1=0.3 FOR 0.5.LE.SLOPE.LT.0.6                             C
C              ..K1=0.2 FOR 0.6.LE.SLOPE.LT.1.0                             C
C              ..K1=0.1 FOR SLOPE.GEQ.1.0                                   C
C              ABDOMEN RULES 2.2.1.b & 2.2.2.b.a & 2.2.2.b.b.1              C
C              (AUG. 10, 1989)                                              C
C              NEF(2) became  NSF(3) IN A[(2.2.2.b.b.2)]                    C
C              (AUG. 10, 1989)                                              C
C              E[(2.2.2.b.b.2)] is made convex comb. rule                   C
C              (AUG. 10, 1989)                                              C
C              E[(1.2.b.1)] is deleted (NOT FORCING TO 1% CLIP)             C
C              (AUG. 10, 1989)                                              C
C              E[(2.2.2.b.b.1)] branched to                                 C
C              (2.2.2.b.b.1.a & b & c)                                      C
C              (AUG. 10, 1989)                                              C
C                                                                           C
C Subprograms                                                               C
C     called  : PRAMID,PEAK,CFIND,GPEAK,AGAIN,EGAIN,CGAIN,SORT              C
C                                                                           C
C                                                                           C
C Detailed                                                                  C
C  description : Program XGAINCDF  uses the pre-scan cumulative             C
C                distribution function (cdf) to determine the final         C
C                scan gain.                                                 C
C                Using the pre-scan cdf, routine PRAMID generates           C
C                a peak-detection signal which is used by routine           C
C                PKFIND to determine the sub-clusters (or peaks) of         C
C                the pre-scan histogram. Sub-clusters are determined C
C                with two different parameter values (two averaging         C
C                window sizes W1 and W2). Using a decision mechanism,C
C                from these two sets of sub-clusters, routine GPEAK         C
C                forms a final set of major histogram clusters.             C
C                This set is then ordered by routine SORT. The              C
C                routines: EGAIN (extremities), AGAIN (abdomen),            C
```

```
C                    CGAIN (chest) are rule-based routines to determine   C
C                    the gain from the final set of clusters.             C
C                    The rules of the decision mechanism for detecting    C
C                    clusters are not transparent to the user. On the     C
C                    other hand user can get a brief description of the   C
C                    rules used in gain setting if desired.               C
C                                                                         C
C                                                                         C
C                                                                         C
C  References :[1] M.I.Sezan and R. Schaetzing,"A method to determine     C
C                    automatically a lung/mediastinum gray-level          C
C                    threshold in digitized chest radiographs using       C
C                    the image cumulative distribution function",(KRL IR) C
C                                                                         C
C              [2] M.I.Sezan, "Automatic anatomically-selective           C
C                    processing of digital chest radiographs using the    C
C                    image cumulative distribution function" (KRL TR)     C
C                                                                         C
C-------------------------------------------------------------------------C C       Common variables (* denotes that program modifies the variable):

REAL*4          CIN(10000)      ! Input cdf (padded)

REAL*4          COUT(0:4095)    ! Decision signal

REAL*4          CSM(10000)      ! Window-averaged cdf

REAL*4          CUMDF(0:4095)   ! Input cdf

INTEGER*4       CVMAX1          ! One less than the maximum code
                                        ! present in the image, i.e.,
                                        ! CVMAX1=CVMAX-1

INTEGER*4       F               ! Arbitrary multiplicative
                                        ! constant REAL*4          FCMOD           ! If search with "PPER" rule fails
                                        ! "PPER" is scaled by "FCMOD" and
                                        ! search is repeated.

INTEGER*4       IHIS(0:4095)    ! Image histogram array

INTEGER*4       JJ              ! JJ=1,2 (window size identifier)
                                        ! (two window sizes are used)

INTEGER*4       KCOUNT(2)       ! Peak counter for two window sizes

INTEGER*4       KOUNT           ! Number of clusters in the histogram

INTEGER*4       L2              ! * LUN for decision signal file
        INTEGER*4       L3              ! * LUN for results file INTEGER*4       MACON           ! Rule parameter for coned ABDOMEN exams.

INTEGER*4       MANCON          ! Rule parameter for unconed ABDOMEN exams.

INTEGER*4       MAUNI           ! Rule parameter for ABDOMEN exams.
                                        ! (Unimodal p-scan histogram)

INTEGER*4       MCNCON          ! Rule parameter for unconed CHEST exams.

INTEGER*4       MCPER           ! The parameter that is used with the
                                        ! 'PPER' rule (see routine CGAIN for details)

INTEGER*4       MCUNI           ! Rule parameter for CHEST exams.
                                        ! (Unimodal p-scan histogram)

INTEGER*4       MECON           ! Rule parameter for coned EXTREMITY exams.

INTEGER*4       MENCON          ! Rule parameter for unconed EXTREMITY exams.
```

| | | |
|---|---|---|
| INTEGER*4 | MEUNIC | ! Rule parameter for coned EXTREMITY exams.<br>! (Unimodal p-scan histogram) |
| INTEGER*4 | MEUNI | ! Rule parameter for unconed EXTREMITY exams.<br>! (Unimodal p-scan histogram) |
| INTEGER*4 | N | ! N = W1   first window size<br>! N = W2   second window size |
| INTEGER*4 | NCLOS | ! "Closeness" criterion. If two<br>! successive sub-clusters are<br>! separated in code value by NCLOS<br>! or less they are grouped into<br>! a single sub-cluster (pre-processing) |
| INTEGER*4 | NE(500,2) | ! End points of clusters |
| INTEGER*4 | NEF(500) | ! Final locations of end points |
| INTEGER*4 | NM1 | ! * NM1=(N-1)/2 |
| INTEGER*4 | NP12 | ! * NP12=(N+1)/2 |
| INTEGER*4 | NS(500,2) | ! Starting points of clusters |
| INTEGER*4 | NSF(500) | ! Final locations of starting points |
| INTEGER*4 | NSTOP | ! The code value at which the·<br>! search for clusters stops |
| INTEGER*4 | NT | ! # of code values |
| INTEGER*4 | NTT | ! * NTT=NT+NP12 |
| REAL*4 | SIGP | ! Significance criteria (in percent)<br>! for sub-clusters |
| INTEGER*4 | PROJEC | ! PROJEC=0: PA/AP; PROJEC=1: LATERAL Chest |
| REAL*4 | SLO | ! Significant left overlap criterium |
| REAL*4 | SRO | ! Significant right overlap criterium |

```
C

COMMON/CDF/CIN,CSM,COUT,CUMDF,IHIS
      COMMON/DATA/N,NT,F,L2,L3,NM1,NP12,NTT
      COMMON/PCRTR/SIGP,NCLOS,SRO,SLO
      COMMON/PEAK/NS,NE,NSTOP,CVMAX1,JJ,KCOUNT
      COMMON/ORDER/NSF,NEF,KOUNT,FCMOD
      COMMON/CGCRT/MCPER,MCNCON,MCUNI,PROJEC
      COMMON/EGCRT/MECON,MENCON,MEUNI,MEUNIC
      COMMON/AGCRT/MACON,MANCON,MAUNI
      COMMON/CONE/CONED
      COMMON/GAIN/G
C
C     Local variables:
```

| | | |
|---|---|---|
| INTEGER*4 | CVMAX | ! Maximum code value present<br>! in the image |
| INTEGER*4 | CVMIN | ! Minimum code value present<br>! in the image |
| CHARACTER*1 | CONED | ! If CONED='Y' then the X-rays<br>! are coned |
| CHARACTER*1 | EXAM | ! Exam type |
| CHARACTER*50 | FCDF | ! Input cdf file |
| CHARACTER*50 | FDECD | ! Decision signal file |
| CHARACTER*50 | FRES | ! Results file |
| REAL*4 | GMULT | ! Multiplier for PITTS gain |
| REAL*4 | GPITTS | ! PITTS gain value |
| REAL*4 | HALTPER | ! If HALTPER percent of the code |

```
                INTEGER*4      L1         ! values are covered then the search
                                          ! for clusters are halted
                REAL*4         LGAIN      ! LUN for input cdf file
                INTEGER*4      W(2)       ! Laser gain
                                          ! Two window sizes C------PERFORMANCE MEASUREMENT
        LSTAT=LIB$INIT_TIMER()
        IF(.NOT.LSTAT) CALL LIB$STOP(%VAL(LSTAT))
C-----------------------------------------------------

TYPE *,' ABREVIATIONS FOR EXAM TYPES:'
        TYPE *,' CHEST = C '
        TYPE *,' EXTREMITIES = E '
        TYPE *,' ABDOMEN = A '
        TYPE 500
500     FORMAT(' SPECIFY THE EXAM TYPE (C/E/A)',T35,'*',$)
        ACCEPT 1010,EXAM
        TYPE 700
700     FORMAT(' WERE THE X-RAYS CONED ? (Y/N) (DEFAULT=Y)',T55,'*',$)
        ACCEPT 1010,CONED
        IF((CONED.NE.'N').AND.(CONED.NE.'Y')) CONED='Y'
        TYPE 1000
1000    FORMAT(' ENTER INPUT CDF FILE SPECS',T35,'*',$)
        ACCEPT 1010,FCDF
1010    FORMAT(A)
        TYPE 2000
2000    FORMAT(' ENTER # OF CODE VALUES (DEFAULT = 4096)',T50,'*',$)
        ACCEPT 2010,NT
2010    FORMAT(I)
        IF( NT.EQ.0 ) NT=4096
        TYPE 3000
3000    FORMAT(' ENTER THE INITIAL WINDOW SIZE (DEFAULT = 2161)',T50,'*',$)
        ACCEPT 2010,W(1)
        IF( W(1).EQ.0 ) W(1)=2161
        TYPE 3500
3500    FORMAT(' ENTER THE SECOND WINDOW SIZE (DEFAULT = 541)',T50,'*',$)
        ACCEPT 2010,W(2)
        IF( W(2).EQ.0 ) W(2)=541
        TYPE 4000
4000    FORMAT(' ENTER THE SCALING FACTOR (DEFAULT = 100)',T50,'*',$)
        ACCEPT 2010,F
        IF( F.EQ.0 ) F=100
        TYPE *,' '
        TYPE *,'(DECISION SIGNAL IS THE SCALED DIFFERENCE OF CDF AND'
        TYPE *,'THE SMOOTH CDF)'
        TYPE 5000
5000    FORMAT(' ENTER FILE SPECS FOR DECISION SIGNAL',T45,'*',$)
        ACCEPT 1010,FDECD
        TYPE 6000
6000    FORMAT(' ENTER THE OUTPUT FILE SPECS FOR RESULTS',T45,'*',$)
        ACCEPT 1010,FRES

TYPE 6050
6050    FORMAT(' ENTER THE LASER GAIN (DEFAULT=18.0)',T45,'*',$)
        ACCEPT 6200,LGAIN
        IF(LGAIN.EQ.0) LGAIN=18.0
        GMULT=255./LGAIN
        TYPE *,' '
        TYPE *,'*** CRITERIA INPUT FOR THE DECISION PROCESS ***'
        TYPE *,' '
        TYPE *,'(SEARCH FOR SUB-CLUSTERS IS STOPPED WHEN "HALTPER" '
        TYPE *,'PERCENT OF THE CODE VALUES ARE COVERED)'
        TYPE 6100
6100    FORMAT(' ENTER THE VALUE FOR "HALTPER" (DEFAULT=100%)',T55,'*',$)
        ACCEPT 6200, HALTPER
6200    FORMAT(F)
        IF(HALTPER.EQ.0) HALTPER=100.0
        HALTPER=HALTPER/100.
        HALTPER1=1.0-HALTPER
        TYPE *,' '
        TYPE *,'(IF TWO SUCCESSIVE SUB-CLUSTERS ARE SEPARATED IN CODE VALUE'
        TYPE *,'BY "NCLOS" OR LESS THEN THEY ARE COMBINED TO FORM A SINGLE'
        TYPE *,'PEAK)'
        TYPE 7000
```

```
7000      FORMAT(' ENTER THE VALUE FOR "NCLOS" (DEFAULT = 10)',T55,'*',$)
          ACCEPT 2010,NCLOS
          IF( NCLOS.EQ.0 ) NCLOS=10
          TYPE *,' '
          TYPE *,'(IF A SUB-CLUSTER COVERS < SIGP PERCENT OF THE TOTAL'
          TYPE *,'# OF CODE VALUES IT IS DELETED)'
          TYPE 8000
8000      FORMAT(' ENTER THE SIGNIFICANCE MEASURE (DEFAULT=1% )',T55,'*',$)
          ACCEPT 9000,SIGP
9000      FORMAT(F)
          IF( SIGP.EQ.0.0 ) SIGP=1.0
          SIGP=SIGP/100.
          TYPE *,' '
          TYPE *,'(IF W2-SUB-CLUSTERS OVERLAP WITH W1-SUB-CLUSTERS FROM RIGHT'
          TYPE *,'SIGNIFICANTLY THEN THE OVERLAP PERCENTAGE IS AT LEAST "SRO")'
          TYPE *,'(SRO=SLO  WITHOT LOSS OF GENERALITY)'
          TYPE 10000
10000     FORMAT(' ENTER THE VALUE FOR "SRO" (DEFAULT=80%)',T55,'*',$)
          ACCEPT 9000,SRO
          IF(SRO.EQ.0.0)   SRO=80.0
          SRO=SRO/100.
          SLO=SRO

C-------EXTREMITY EXAMS

IF(EXAM.EQ.'E') THEN

TYPE *,' '
             TYPE *,'*CRITERIA INPUT FOR EXTREMITIES*'
             TYPE *,' '
             TYPE *,' >> For RULE DETAILS see SUBROUTINE EGAIN'
             TYPE *,'   ---------------------------------------'
             TYPE *,' '

IF(CONED.EQ.'Y') THEN

TYPE 11000
11000           FORMAT(' ENTER THE VALUE OF "MEUNIC"(DEFAULT=1500)',T55,'*',$)
                ACCEPT 2010,MEUNIC
                IF(MEUNIC.EQ.0) MEUNIC=1500
                TYPE 12000
12000           FORMAT(' ENTER THE VALUE OF "MECON"(DEFAULT=3500)',T55,'*',$)
                ACCEPT 2010,MECON
                IF(MECON.EQ.0) MECON=3500

ELSE

TYPE 12500
12500           FORMAT(' ENTER THE VALUE FOR "MEUNI"(DEFAULT=3500)',T55,'*',$)
                ACCEPT 2010,MEUNI
                IF(MEUNI.EQ.0) MEUNI=3500
                TYPE 13000
13000           FORMAT(' ENTER THE VALUE OF "MENCON"(DEFAULT=4095)',T55,'*',$)
                ACCEPT 2010,MENCON
                IF(MENCON.EQ.0) MENCON=4095

END IF

TYPE *,' >> PROGRAM IS IN PROGRESS...'
          GO TO 777

END IF

C-------ABDOMEN EXAMS

IF(EXAM.EQ.'A') THEN

TYPE *,' '
             TYPE *,'*CRITERIA INPUT FOR ABDOMEN*'
             TYPE *,' '
```

```
              TYPE *,' >> For RULE DETAILS see SUBROUTINE AGAIN'
              TYPE *,'    ------------------------------------'
              TYPE *,' '

IF(CONED.EQ.'Y') THEN

TYPE 14000
14000            FORMAT(' ENTER THE VALUE OF "MACON"(DEFAULT=3500)',T55,'*',$)
                 ACCEPT 2010,MACON
                 IF(MACON.EQ.0) MACON=3500

ELSE

TYPE 15000
15000            FORMAT(' ENTER THE VALUE FOR "MAUNI"(DEFAULT=1500)',T55,'*',$)
                 ACCEPT 2010,MAUNI
                 IF(MAUNI.EQ.0) MAUNI=1500
                 TYPE 16000
16000            FORMAT(' ENTER THE VALUE OF "MANCON"(DEFAULT=4095)',T55,'*',$)
                 ACCEPT 2010,MANCON
                 IF(MANCON.EQ.0) MANCON=4095

END IF

TYPE *,' >> PROGRAM IS IN PROGRESS...'
           GO TO 777

END IF

C------CHEST EXAMS

IF(EXAM.EQ.'C') THEN

TYPE *,' '
           TYPE *,' .....LATERAL or PA/AP chest ?????'
           TYPE *,' '
           TYPE 16500
16500      FORMAT(' ENTER 1=LAT or 0=PA/AP',T55,'*',$)
           ACCEPT 2010, PROJEC
           TYPE *,' '
           TYPE *,' *CRITERIA INPUT FOR CHEST EXAM*'
           TYPE *,' '
           TYPE *,' >> For RULE DETAILS see SUBROUTINE CGAIN'
           TYPE *,'    ------------------------------------'
           TYPE *,' '
           TYPE 17000
17000      FORMAT(' ENTER THE VALUE FOR "MCUNI"',T55,'*',$)
           TYPE *,'(DEFAULT=2250 FOR AP/PA; 2900 FOR LATERAL)'
           TYPE *,' '
           ACCEPT 2010,MCUNI
           IF(MCUNI.EQ.0) THEN
              IF(PROJEC.EQ.0) THEN
                 MCUNI=2250
              ELSE
                 MCUNI=2900
              END IF
           END IF
           TYPE *,' '
           TYPE 18000
18000      FORMAT(' ENTER THE VALUE FOR "MCPER"(DEFAULT=4095)',T55,'*',$)
           ACCEPT 2010,MCPER
           IF(MCPER.EQ.0) MCPER=4095
           TYPE *,' '
           TYPE 18500
18500      FORMAT(' ENTER THE VALUE FOR "FCMOD"(DEFAULT=1.2)',T55,'*',$)
           ACCEPT 18750,FCMOD
18750      FORMAT(F)
           IF(FCMOD.EQ.0.0) FCMOD=1.2
           TYPE *,' '
           TYPE 19000
19000      FORMAT(' ENTER THE VALUE FOR "MCNCON"(DEFAULT=4095)',T55,'*',$)
           ACCEPT 2010,MCNCON
```

```
            IF(MCNCON.EQ.0) MCNCON=4095
            TYPE *,' '
            TYPE *, ' >> PROGRAM IS IN PROGRESS...'

END IF
C------OPEN THE FILES

777     LSTAT=LIB$GET_LUN(L1)
        IF(.NOT.LSTAT) CALL LIB$STOP(%VAL(LSTAT))
        LSTAT=LIB$GET_LUN(L2)
        IF(.NOT.LSTAT) CALL LIB$STOP(%VAL(LSTAT))
        LSTAT=LIB$GET_LUN(L3)
        IF(.NOT.LSTAT) CALL LIB$STOP(%VAL(LSTAT))

OPEN(UNIT=L1,FILE=FCDF,READONLY,STATUS='OLD')
        OPEN(UNIT=L2,FILE=FDECD,STATUS='NEW')
        OPEN(UNIT=L3,FILE=FRES,STATUS='NEW')

DO 5  I=0,NT-1           ! INITIALIZE HISTOGRAM ARRAY...
        IHIS(I)=0.0
5       CONTINUE

MINFLG=0                 ! FLAG FOR MINIMUM CV DETECTION...
        DO 10 I=0,NT-1
        READ(L1,*) J,IHIS(J),Z,CUMDF(J)    ! READ IN THE HISTOGRAM AND THE cdf

IF(MINFLG.EQ.0) THEN

IF(IHIS(J).NE.0.0) THEN
             CVMIN=J                       ! MINIMUM CV......
             MINFLG=1
           END IF

END IF

IF(CUMDF(J).EQ.1.0) THEN

CVMAX=J
           GO TO 15

END IF

10      CONTINUE

15      CUMDF(0)=CUMDF(CVMIN)              ! FILLING IN THE cdf VALUES AT
                                           ! 'ZERO POPULATION' VALUES...
        DO 18 I=1,CVMAX
        IF(IHIS(I).EQ.0.0) CUMDF(I)=CUMDF(I-1)
18      CONTINUE DO 20 I=CVMAX+1,NT-1               ! PADDING.....
        CUMDF(I)=1.0
20      CONTINUE DO 30 JJ=1,2
        N=W(JJ)
        NM1=(N-1)/2
        NP12=(N+1)/2
        NTT=NT+NP12

C------INITIALIZING
        DO 40 I=1,NP12                     ! PADDING
        CIN(I)=CUMDF(0)
40      CONTINUE

DO 50 I=NP12+1,NTT+NP12            ! INITIALIZING AND PADDING
        CIN(I)=1.0
50      CONTINUE
```

```
C------FILLING IN THE INPUT-WORK ARRAY

DO 60 I=NP12+1,NTT
        K=I-NP12-1
        CIN(I)=CUMDF(K)
        IF(CUMDF(K).EQ.1.0) GO TO 65
60      CONTINUE

C------CALCULATE STOPPING CODE VALUE AND PRINT OUT THE CRITERIA

65      IF(JJ.EQ.2) GO TO 888
        CVMAX1=CVMAX-1
        STPER=CUMDF(CVMAX1)-HALTPER1        ! STOPPING PERCENTAGE
        CM1PER=CUMDF(CVMAX1)                ! PERCENTAGE AT (CVMAX-1)
        WRITE(L3,70) FCDF
70      FORMAT(' ',A)
        WRITE(L3,*) ' '
        WRITE(L3,*) ' **MINIMUM CODE VALUE (CVMIN) :', CVMIN
        WRITE(L3,*) ' **MAXIMUM CODE VALUE (CVMAX) :', CVMAX
        WRITE(L3,*) ' **PERCENTAGE REACHED AT CV=CVMAX-1 :', CM1PER
        WRITE(L3,*) ' **STOPPING PERCENTAGE :', STPER

CALL CFIND(STPER)

WRITE(L3,*) ' **STOPPING CODE VALUE :', NSTOP
        WRITE(L3,*) ' '
        WRITE(L3,*) ' DETECTION CRITERIA:       '
        WRITE(L3,*) ' '
        WRITE(L3,*) ' HALTPER = ', HALTPER
        WRITE(L3,*) ' NCLOS   = ', NCLOS
        WRITE(L3,*) ' SIGP    = ', SIGP
        WRITE(L3,*) ' SRO     = ', SRO
        WRITE(L3,*) ' SLO     = ', SLO
        WRITE(L3,*) ' '
        WRITE(L3,*) ' LASER GAIN:'
        WRITE(L3,*) ' LGAIN   = ', LGAIN
        WRITE(L3,*) ' '
        WRITE(L3,*) ' PITTS GAIN MULTIPLIER:'
        WRITE(L3,*) ' GMULT   = ', GMULT
        WRITE(L3,*) ' '
        WRITE(L3,*) ' EXAM DEPENDENT CRITERIA:   '
        WRITE(L3,*) ' '

IF(EXAM.EQ.'E') THEN
        WRITE(L3,*) ' EXAM TYPE: EXTREMITY '
        WRITE(L3,*) ' '
        WRITE(L3,*) ' CONED = ',CONED
        IF(CONED.EQ.'Y') THEN

WRITE(L3,*) ' MECON  = ',MECON
           WRITE(L3,*) ' MEUNIC = ',MEUNIC

ELSE

WRITE(L3,*) ' MENCON = ',MENCON
           WRITE(L3,*) ' MEUNI  = ',MEUNI
           WRITE(L3,*) ' '

END IF

END IF

IF(EXAM.EQ.'A') THEN

WRITE(L3,*) ' EXAM TYPE: ABDOMEN '
           WRITE(L3,*) ' '
           WRITE(L3,*) ' CONED = ',CONED
           IF(CONED.EQ.'Y') THEN

WRITE(L3,*) ' MACON = ',MACON
              WRITE(L3,*) ' MAUNI = ',MAUNI
```

```
          ELSE

WRITE(L3,*) ' MANCON = ',MANCON
             WRITE(L3,*) ' MAUNI  = ',MAUNI
             WRITE(L3,*) ' '

END IF

END IF

IF(EXAM.EQ.'C') THEN

WRITE(L3,*) ' EXAM TYPE: CHEST '
          WRITE(L3,*) ' PROJEC = ',PROJEC
          WRITE(L3,*) ' '
          WRITE(L3,*) ' CONED  = ',CONED
          WRITE(L3,*) ' MCPER  = ',MCPER
          WRITE(L3,*) ' MCNCON = ',MCNCON
          WRITE(L3,*) ' MCUNI  = ',MCUNI
          WRITE(L3,*) ' FCMOD  = ',FCMOD
          WRITE(L3,*) ' '

END IF

888    CALL PRAMID
       CALL PKFIND
       REWIND L1
30     CONTINUE

CALL GPEAK
       CALL SORT

C------EXAM DEPENDENT GAIN CALCULATION

IF(EXAM.EQ.'C') THEN

CALL CGAIN
          GPITTS=GMULT*G
          WRITE(L3,*) '  GPITTS= ',GPITTS
          GO TO 999

END IF

IF(EXAM.EQ.'E') THEN

CALL EGAIN
          GPITTS=GMULT*G
          WRITE(L3,*) '  GPITTS= ',GPITTS
          GO TO 999

END IF

IF(EXAM.EQ.'A') THEN

CALL AGAIN
          GPITTS=GMULT*G
          WRITE(L3,*) '  GPITTS= ',GPITTS
          GO TO 999

END IF

C------TIMING

999    LSTAT=LIB$SHOW_TIMER()
       IF(.NOT.LSTAT) CALL LIB$STOP(%VAL(LSTAT))
C
       STOP
       END
```

```
C----------------------------------------------------------------C
               SUBROUTINE   PRAMID
C----------------------------------------------------------------C
C                                                                C
C     Purpose    :  To generate the 'detection' signal which will be  C
C                   used by subroutine PKFIND to detect clusters  C
C                   (or peaks)                                    C
C                                                                C
C     Author     :  M.Ibrahim Sezan                              C
C                   Research Laboratories, Eastman Kodak Company C
C                   August 15,1985                               C
C                                                                C
C  Modifications:   None                                         C
C                                                                C
C   Detailed                                                     C
C   description :   The detection signal is the scaled difference C
C                   of the input cdf and the averaged input cdf. C
C                   The averaging is performed via a running window. C
C                                                                C
C  Special                                                       C
C  considerations: The initial window sizes (W1) and (W2) are set to C
C                   their default values unless they are specified by C
C                   the user.                                    C
C----------------------------------------------------------------C C        Common Variables

REAL*4      CIN(10000)

REAL*4      CSM(10000)

REAL*4      COUT(0:4095)

REAL*4      CUMDF(0:4095)

INTEGER*4   F

INTEGER*4   IHIS(0:4095)

INTEGER*4   L2

INTEGER*4   L3

INTEGER*4   N

INTEGER*4   NM1

INTEGER*4   NP12

INTEGER*4   NT

INTEGER*4   NTT

COMMON/CDF/CIN,CSM,COUT,CUMDF,IHIS
         COMMON/DATA/N,N1,F,L2,L3,NM1,NP12,NTT

DO 10 I=1,NTT+NP12
         CSM(I)=CIN(I)
10       CONTINUE

S=0.0
         DO 20 I=1,N
         S=S+(CIN(I))/N
20       CONTINUE
         CSM(NP12)=S

C------SMOOTHING
```

```
      DO 30 I=N+1,NTT+NP12
      S=S+(CIN(I))/N
      K=I-N
      S=S-(CIN(K))/N
      K=I-NM1
      CSM(K)=S
30    CONTINUE

C------FORMING THE OUTPUT TO BE USED IN THE DECISION PROCESS

DO 40 I=1,NT
      K=I+NP12
      I1=I-1
      COUT(I1)=F*(CIN(K)-CSM(K))
      WRITE(L2,*) I1,COUT(I1)
40    CONTINUE

RETURN
      END
C----------------------------------------------------------------------C
C                      SUBROUTINE PKFIND                               C
C----------------------------------------------------------------------C
C                                                                      C
C       Purpose : To use the detection signal computed at PRAMID       C
C                 in finding sub-clusters (or peaks) for two different C
C                 window sizes.                                        C
C                 The final set of clusters that will be used in       C
C                 determining the gain will be  constructed in GPEAK   C
C                                                                      C
C       Author  : M. Ibrahim Sezan                                     C
C                 Research Laboratories, Eastman Kodak Company         C
C                 October 14,1985                                      C
C                                                                      C
C Modifications : None                                                 C
C                                                                      C
C                                                                      C
C  Detailed                                                            C
C   description : See References.                                      C
C                                                                      C
C----------------------------------------------------------------------C C       Common Variables REAL*4      CIN(10000)
        REAL*4      COUT(0:4095)
        REAL*4      CSM(10000)
        REAL*4      CUMDF(0:4095)
        INTEGER*4   CVMAX1
        INTEGER*4   F
        INTEGER*4   IHIS(0:4095)
        INTEGER*4   JJ
        INTEGER*4   KCOUNT(2)            ! KCOUNT(1) : # of W1-sub-clusters(peaks)
                                         ! KCOUNT(2) : # of W2-sub-clusters(peaks)
        INTEGER*4   L2
        INTEGER*4   L3
        INTEGER*4   N
        INTEGER*4   NCLOS
        INTEGER*4   NE(500,2)            ! NE(I,1)  refers to the I th peak
                                         ! detected with window size = W1
                                         ! NE(K,2)  refers to the K th peak
                                         ! detected with window size = W2
        INTEGER*4   NM1
        INTEGER*4   NP12
        INTEGER*4   NS(500,2)            ! NS(I,1) refers to the I th peak
                                         ! detected with window size = W1
                                         ! NS(K,2) refers to the K th peak
                                         ! detected with window size = W2
        INTEGER*4   NSTOP
        INTEGER*4   NT
        INTEGER*4   NTT
```

```
        REAL*4       SIGP
        REAL*4       SLO
        REAL*4       SRO
        COMMON/CDF/CIN,CSM,COUT,CUMDF,IHIS
        COMMON/DATA/N,NT,F,L2,L3,NM1,NP12,NTT
        COMMON/PCRTR/SIGP,NCLOS,SLO,SRO
        COMMON/PEAK/NS,NE,NSTOP,CVMAX1,JJ,KCOUNT

CMAX=0.0
        FLAG=0.0
        K=0
        I=0

10      IF(I.LT.NSTOP) GO TO 20
        NE(K,JJ)=MAXIN
        GO TO 30

20      IF(COUT(I).GT.0.0) THEN

IF(FLAG.EQ.1.0) THEN

IF(COUT(I).GT.CMAX) THEN

CMAX=COUT(I)
                MAXIN=I
                I=I+1
                GO TO 10

ELSE

I=I+1
                GO TO 10

END IF

ELSE

I=I+1
                   GO TO 10

END IF

ELSE

IF((COUT(I-1).GT.0.0).OR.(I.EQ.0)) THEN

K=K+1                          ! NEXT SUB-CLUSTER ....
             KCOUNT(JJ)=K                   ! UPDATE SUB-CLUSTER COUNTER
             FLAG=1.0
             NS(K,JJ)=I                     ! STARTING POINT OF THE
                                            ! SUB-CLUSTER

IF(K.EQ.1) THEN                ! FIRST SUB-CLUSTER TREATED
                                            ! ACCORDINGLY ......
                I=I+1
                GO TO 10

END IF

NE(K-1,JJ)=MAXIN
             CMAX=0.0
             I=I+1

IF(I.EQ.NSTOP) MAXIN=NSTOP     ! IF A 'START' OCCURS AT 1 CODE
                                            ! VALUE BEFORE THE STOPPING CODE
                                            ! VALUE, 'END' POINT IS TAKEN TO
                                            ! BE 'NSTOP'.

GO TO 10

ELSE

I=I+1
```

```fortran
           IF(I.EQ.NSTOP) MAXIN=NSTOP    ! 'NSTOP' IS REACHED WHEN THE
                                         ! DECISION SIGNAL WAS
                                         ! NEGATIVE SINCE THE LAST
                                         ! NEGATIVE CROSSOVER OCCURED
           GO TO 10
         END IF

END IF

C------PRINT OUT THE SUB-CLUSTERS DETECTED

30       WRITE(L3,500)N
500      FORMAT(2X,'**** WINDOW SIZE : ',I4)
         WRITE(L3,750)
750      FORMAT(10X,'** SUB-CLUSTERS DETECTED **',//)

DO 40 I=1,KCOUNT(JJ)
         WRITE(L3,1000)NS(I,JJ),NE(I,JJ)
1000     FORMAT(/,20X,I4,',',I4,//)
40       CONTINUE

C------PREPROCESSING OF THE SUB-CLUSTERS: SUB-CLUSTERS THAT ARE CLOSE IN CODE
C------VALUE ARE GROUPED TOGETHER. IF((NS(I+1,JJ)-NE(I,JJ)).LT.NCLOS)
C------THEN NE(I,JJ)=NE(I+1,JJ). NCLOS IS A 'CLOSENESS' CRITERIA.

J=0                             ! COUNTER RESET

DO 45 I=2,KCOUNT(JJ)
         NDIF=NS(I,JJ)-NE(I-J-1,JJ)

IF(NDIF.LT.NCLOS) THEN

NE(I-J-1,JJ)=NE(I,JJ)
           J=J+1                         ! COUNTER UPDATE

ELSE

NS(I-J,JJ)=NS(I,JJ)
           NE(I-J,JJ)=NE(I,JJ)

END IF

45       CONTINUE

KCOUNT(JJ)=KCOUNT(JJ)-J         ! # OF SUB-CLUSTERS AFTER PRE-PROCESSING
         WRITE(L3,1200)
1200     FORMAT(10X,'** SUB-CLUSTERS AFTER GROUPING **',//)

DO 48 I=1,KCOUNT(JJ)
         WRITE(L3,1000) NS(I,JJ),NE(I,JJ)
48       CONTINUE

C------PRE-SIGNIFICANCE TEST FOR SUB-CLUSTERS
C------IF(CUMDF(NE(K,JJ))-CUMDF(NS(K,JJ))) > SIGP  THEN ( NS(K,JJ),NE(K,JJ) ) IS
C------A SIGNIFICANT SUB-CLUSTER TO BE CONSIDERED IN THE DECISION.

SFLAG=0.0                       ! FLAG TO INDICATE EXISTANCE OF
                                         ! INSIGNIFICANT SUB-CLUSTERS.
         WRITE(L3,1500)
1500     FORMAT(10X,'** SIGNIFICANT SUB-CLUSTERS **',//)

DO 50 I=1,KCOUNT(JJ)
         NAUX1=NE(I,JJ)
         NAUX2=NS(I,JJ)
         S=(CUMDF(NAUX1)-CUMDF(NAUX2))   ! SIGNIFICANCE INDEX

IF(S.LT.SIGP) THEN

SFLAG=1.0                     ! INSIGNIFICANT CLUSTERS EXIST
           NE(I,JJ)=-1                   ! INSIGNIFICANT CLUSTER START/END
           NS(I,JJ)=NE(I,JJ)             ! POINTS REPLACED BY -1 FOR IDENTIFICATION
           CONTINUE
```

```
            ELSE
               WRITE(L3,2000)NS(I,JJ),NE(I,JJ),S
2000           FORMAT(20X,I4,',',I4,'   IS SIGNIFICANT ',' S= ',G,//)

END IF

50       CONTINUE

C------IF ALL SUB-CLUSTERS ARE SIGNIFICANT THE NEXT STEP IS OMITTED.

IF(SFLAG.EQ.0.0) RETURN

C------REARRANGING SIGNIFICANT SUB-CLUSTERS. INSIGNIFICANT SUB-CLUSTERS
C------ARE DELETED AND THE REST IS RENUMBERED.

M=0                         ! SIGNIFICANT SUB-CLUSTER COUNTER RESET
         DO 60 I=1,KCOUNT(JJ)

IF(NS(I,JJ).NE.-1) THEN

M=M+1
            NS(M,JJ)=NS(I,JJ)        ! SIGNIFICANT SUB-CLUSTER START POINT
            NE(M,JJ)=NE(I,JJ)        ! SIGNIFICANT SUB-CLUSTER END POINT

END IF

60       CONTINUE

KCOUNT(JJ)=M                ! THE # OF SUB-CLUSTERS IS SET TO THE
                                     ! # OF SIGNIFICANT SUB-CLUSTERS

RETURN
         END
C----------------------------------------------------------------------C
                     SUBROUTINE CFIND(STPER)
C----------------------------------------------------------------------C
C                                                                      C
C     Purpose  : To determine the code value corresponding to the      C
C                stopping point characterized by a percentage STPER.   C
C                (STPER percent of the code values lie below the       C
C                stopping code value NSTOP).                           C
C                                                                      C
C     Author   : M.Ibrahim Sezan                                       C
C                Research Laboratories, Eastman Kodak Company          C
C                August 15, 1985                                       C
C----------------------------------------------------------------------C C     Common Variables :

REAL*4      CIN(10000)
         REAL*4      CM1PER
         REAL*4      COUT(0:4095)
         REAL*4      CSM(10000)
         REAL*4      CUMDF(0:4095)
         INTEGER*4   CVMAX1
         INTEGER*4   F
         INTEGER*4   IHIS(0:4095)
         INTEGER*4   JJ
         INTEGER*4   KCOUNT(2)
         INTEGER*4   L2
         INTEGER*4   L3
         INTEGER*4   N
         INTEGER*4   NE(500,2)
         INTEGER*4   NM1
         INTEGER*4   NP12
         INTEGER*4   NS(500,2)
         INTEGER*4   NSTOP
         INTEGER*4   NT
         INTEGER*4   NTT

COMMON/CDF/CIN,CSM,COUT,CUMDF,IHIS
         COMMON/DATA/N,NT,F,L2,L3,NM1,NP12,NTT
```

```
        COMMON/PEAK/NS,NE,NSTOP,CVMAX1,JJ,KCOUNT

C       Input Arguments :

REAL*4    STPER      ! Stopping percentage

DO 10 I=0,NT-1

IF(CUMDF(I).GE.STPER) THEN

NSTOP=I
           RETURN

END IF

10      CONTINUE
        RETURN
        END
C----------------------------------------------------------------C
C                        SUBROUTINE GPEAK                        C
C----------------------------------------------------------------C
C                                                                C
C       Purpose    : Use the two sets of sub-clusters determined by two    C
C                    window sizes (W1 and W2) to form a final set of       C
C                    clusters that will be used by GAIN to compute the     C
C                    gain factor                                           C
C                                                                C
C       Author     : M.Ibrahim Sezan                             C
C                    Research Laboratories, Eastman Kodak Company C
C                    October 14,1985                             C
C                                                                C
C       Modifications : None                                     C
C                                                                C
C       Subprograms                                              C
C            called   : PLACE                                    C
C                                                                C
C       Detailed                                                 C
C        description : A W2-peak qualifies for the final set if: C
C                                                                C
C                     a) It either does not overlap with any W1-peak       C
C                        or  it overlaps insignificantly with a W1-peak.   C
C                        ('Independent' W2-peak)                 C
C                        (significance is determined by SLO and SRO        C
C                         criteria)                              C
C                                                                C
C                     b) It overlaps with a W1-peak but there is at least  C
C                        one other W2-peak that overlaps with the same     C
C                        W1-peak.                                C
C                                                                C
C                     A W1-peak qualifies for the final set if :           C
C                                                                C
C                     a) It is an 'independent'  W1-peak         C
C                                                                C
C                     b) There is at most one W2-peak overlaping with the  C
C                        W1-peak                                 C
C----------------------------------------------------------------C C       Common variables REAL*4         CIN(10000)
           REAL*4         CSM(10000)
           REAL*4         COUT(0:4095)
           REAL*4         CUMDF(0:4095)
           INTEGER*4      CVMAX1
           REAL*4         FCMOD
           INTEGER*4      IHIS(0:4095)
           INTEGER*4      JJ
```

```
            INTEGER*4         KCOUNT(2)
            INTEGER*4         KOUNT              ! Total # of histogram clusters
                                                 ! to be used in gain setting
            INTEGER*4         NCLOS
            INTEGER*4         NE(500,2)
            INTEGER*4         NEF(500)
            INTEGER*4         NS(500,2)
            INTEGER*4         NSF(500)
            INTEGER*4         NSTOP
            REAL*4            SIGP
            REAL*4            SLO
            REAL*4            SRO C       Local Variables INTEGER*4         IFLAG
            INTEGER*4         IND(0:499,0:499)   ! IND(K,I) : K refers to the
                                                 ! K th W2-peak, and I refers
                                                 ! to the I th w1-peak.
                                                 ! If the K th W2-peak overlaps
                                                 ! significantly with the I th
                                                 ! W1-peak, or If the K th
                                                 ! W2-peak is contained in the
                                                 ! I th W1-peak  then IND(K,I)
                                                 ! is set to '1' ( IND(K,I)=1 )

! However If the K th W2-peak
                                                 ! does not significantly overlap
                                                 ! with any of the W1-peaks then
                                                 ! IND(K,0)=1

COMMON/CDF/CIN,CSM,COUT,CUMDF,IHIS
            COMMON/DATA/N,NT,F,L2,L3,NM1,NP12,NTT
            COMMON/PCRTR/SIGP,NCLOS,SRO,SLO
            COMMON/PEAK/NS,NE,NSTOP,CVMAX1,JJ,KCOUNT
            COMMON/ORDER/NSF,NEF,KOUNT,FCMOD

DO I=0,KCOUNT(1)
            DO J=1,KCOUNT(2)
            IND(J,I)=0
            ENDDO
            ENDDO

KOUNT=0

I=1
            K=1

C------W1-PEAK CONTAINED IN W2-PEAK

10          IF((NS(K,2).LT.NS(I,1)).AND.(NE(K,2).GE.NE(I,1)).OR.
     $         (NS(K,2).LE.NS(I,1)).AND.(NE(K,2).GT.NE(I,1))) THEN

NS(I,1)=NS(K,2)            ! REPLACE W1-PEAK BY THE W2-PEAK
               NE(I,1)=NE(K,2)

IND(K,I)=1
               K=K+1
               IF(K.GT.KCOUNT(2)) GO TO 20
            END IF

C------W2-PEAK CONTAINED IN W1-PEAK

IF((NS(K,2).GE.NS(I,1)).AND.(NE(I,1).GE.NE(K,2))) THEN

IND(K,I)=1
               K=K+1
               IF(K.GT.KCOUNT(2)) GO TO 20
```

```
            GO TO 10

END IF

C------W2-PEAK OVERLAPS WITH W1-PEAK FROM LEFT

IF((NS(K,2).LE.NS(I,1)).AND.(NS(I,1).LE.NE(K,2))) THEN

X=CUMDF(NE(K,2))-CUMDF(NS(I,1))
            Y=CUMDF(NE(K,2))-CUMDF(NS(K,2))
            PL=X/Y                             ! LEFT OVERLAP PERCENTAGE

IF(PL.GE.SLO) THEN         ! SIGNIFICANT LEFT OVERLAP

IND(K,I)=1
               K=K+1
               IF(K.GT.KCOUNT(2)) GO TO 20
               GO TO 10

ELSE                       ! INSIGNIFICANT LEFT OVERLAP
                                       ! INDEPENDENT PEAK
               IND(K,0)=1
               K=K+1
               IF(K.GT.KCOUNT(2)) GO TO 20
               GO TO 10

END IF

END IF

C------W2-PEAK OVERLAPS WITH W1-PEAK FROM RIGHT

IF((NS(K,2).LE.NE(I,1)).AND.(NE(I,1).LE.NE(K,2))) THEN

X=CUMDF(NE(I,1))-CUMDF(NS(K,2))
            Y=CUMDF(NE(K,2))-CUMDF(NS(K,2))
            PR=X/Y                             ! RIGHT OVERLAP PERCENTAGE

PL=0.0
            IF(I.LT.KCOUNT(1)) THEN    ! POSSIBILITY OF LEFT OVERLAP WITH THE
                                       ! NEXT W1-PEAK

X=CUMDF(NE(K,2))-CUMDF(NS(I+1,1))
               PL=X/Y                  ! LEFT OVERLAP PERCENTAGE

END IF

IF(PR.GE.PL) THEN          ! RIGHT OVERLAP
              IF(PR.GE.SRO) THEN       ! SIGNIFICANT RIGHT OVERLAP

IND(K,I)=1
                 K=K+1
                 IF(K.GT.KCOUNT(2)) GO TO 20
                 GO TO 10

ELSE                     ! INSIGNIFICANT RIGHT OVERLAP
                                       ! INDEPENDENT PEAK

IND(K,0)=1.0
                 K=K+1
                 IF(K.GT.KCOUNT(2)) GO TO 20
                 GO TO 10

END IF

ELSE                       ! LEFT OVERLAP WITH NEXT W1-PEAK

IF(PL.GE.SLO) THEN       ! SIGNIFICANT LEFT OVERLAP

I=I+1
                 IND(K,I)=1
                 K=K+1
                 IF(K.GT.KCOUNT(2)) GO TO 20
                 GO TO 10
```

```
            ELSE                           ! INSIGNIFICANT LEFT OVERLAP

IND(K,0)=1
                K=K+1
                IF(K.GT.KCOUNT(2)) GO TO 20
                GO TO 10

END IF

END IF

END IF

C------W2-PEAK LIES TO THE LEFT/RIGHT OF W1-PEAK WITH NO OVERLAP

IF(NS(K,2).LT.NS(I,1))  THEN    ! W2-PEAK LIES TO THE LEFT OF
                                        ! W1-PEAK WITH NO OVERLAP

IND(K,0)=1
          K=K+1
          IF(K.GT.KCOUNT(2)) GO TO 20
          GO TO 10

ELSE                            ! W2-PEAK LIES TO THE RIGHT OF
                                        ! W1-PEAK WITH NO OVERLAP

IF(I.GE.KCOUNT(1))  THEN      ! IT LIES TO THE RIGHT OF LAST W1-PEAK

IND(K,0)=1
            K=K+1
            IF(K.GT.KCOUNT(2)) GO TO 20
            GO TO 10

END IF

DO 15 L=I+1,KCOUNT(1)         ! CHECK FOR POSSIBLE OVERLAPS WITH UPCOMING
                                        ! W1-PEAKS

C-*---POSSIBLE OVERLAPS ?...            ! Feb. 11/88 modification
                                        ! Feb. 23/88 modification
      IF ((NE(K,2).GE.NE(L,1)).AND.(NS(K,2).LE.NE(L,1))) THEN
          I=L           !!! AN OVERLAP EXISTS
          GO TO 10
      END IF

!!! OR !!!

IF ((NE(K,2).GE.NS(L,1)).AND.(NS(K,2).LE.NS(L,1))) THEN
          I=L           !!! AN OVERLAP EXISTS       ! FEB. 23/88
          GO TO 10
      END IF

!!! OR !!!

IF ((NE(K,2).LT.NE(L,1)).AND.(NS(K,2).GT.NS(L,1))) THEN
          I=L           !!! AN OVERLAP EXISTS       ! FEB. 23/88
          GO TO 10
      END IF

15        CONTINUE

IND(K,0)=1
            K=K+1
            IF(K.GT.KCOUNT(2)) GO TO 20
            GO TO 10

END IF

C------PLACEMENT OF THE CLUSTERS TO FINAL ARRAYS

20      NN=0
```

```
      DO 22 I=1,KCOUNT(1)       ! PLACEMENT OF ' INDEPENDENT' W1-PEAKS
      DO 25 K=1,KCOUNT(2)
      IF(IND(K,I).EQ.1) NN=NN+1
25    CONTINUE
      IF(NN.EQ.0)   THEN         ! NO W2-PEAK OVERLAPS WITH THIS W1-PEAK
                                 ! INDEPENDENT W1-PEAK
         IFLAG=1
         CALL PLACE(I,IFLAG)

END IF
      NN=0
22    CONTINUE

LL=0
      DO 30 K=1,KCOUNT(2)

IF(IND(K,0).EQ.1) THEN     ! INDEPENDENT W2-PEAK

IFLAG=2
         CALL PLACE(K,IFLAG)

END IF

30    CONTINUE

DO 40 I=1,KCOUNT(1)
      DO 50 K=1,KCOUNT(2)
      IF(IND(K,I).EQ.1) LL=LL+1
50    CONTINUE
      IF(LL.EQ.1) THEN

IFLAG=1
         CALL PLACE(I,IFLAG)
         LL=0

ELSE

DO 60 KK=1,KCOUNT(2)
         IF (IND(KK,I).EQ.1) THEN

IFLAG=2
            CALL PLACE(KK,IFLAG)

END IF
60       CONTINUE
         LL=0

END IF

40    CONTINUE

WRITE(L3,100)
100   FORMAT(10X,'** FINAL HISTOGRAM CLUSTERS USED IN GAIN SETTING **',/)

DO 70 I=1,KOUNT
      WRITE(L3,200) NSF(I),NEF(I)
200   FORMAT(/,20X,I4,',',I4,//)
70    CONTINUE

RETURN
      END
```

```
C----------------------------------------------------------------------C
                    SUBROUTINE PLACE(MM,IFLAG)
C----------------------------------------------------------------------C
C                                                                      C
C      Purpose : To place the clusters into the final array.           C
C                (Forming the final set of clusters)                   C
C                                                                      C
C      Author  : M.Ibrahim Sezan                                       C
C                Research Laboratories, Eastman Kodak Company          C
C                October 14,1985                                       C
C                                                                      C
C   Modifications: None                                                C
C                                                                      C
C----------------------------------------------------------------------C C       Common Variables REAL*4          CIN(10000)
        REAL*4          COUT(0:4095)
        REAL*4          CSM(10000)
        REAL*4          CUMDF(0:4095)
        INTEGER*4       CVMAX1
        REAL*4          FCMOD
        INTEGER*4       IHIS(0:4095)
        INTEGER*4       JJ
        INTEGER*4       KCOUNT(2)
        INTEGER*4       KOUNT
        INTEGER*4       NE(500,2)
        INTEGER*4       NEF(500)
        INTEGER*4       NS(500,2)
        INTEGER*4       NSF(500)
        INTEGER*4       NSTOP C       Input Variables INTEGER*4       MM              ! Indicates the  MM th peak
        INTEGER*4       IFLAG           ! IFLAG=1 characterizes a W1-peak
C                                       ! IFLAG=2 characterizes a W2-peak COMMON/CDF/CIN,CSM,COUT,CUMDF,IHIS
        COMMON/PEAK/NS,NE,NSTOP,CVMAX1,JJ,KCOUNT
        COMMON/ORDER/NSF,NEF,KOUNT,FCMOD

KOUNT=KOUNT+1

NSF(KOUNT)=NS(MM,IFLAG)
        NEF(KOUNT)=NE(MM,IFLAG)

RETURN
        END
C----------------------------------------------------------------------C
                    SUBROUTINE SORT
C----------------------------------------------------------------------C
C                                                                      C
C      Purpose : To order the final set of clusters.The ordered        C
C                set is used for gain setting.                         C
C                                                                      C
C      Author  : M.Ibrahim Sezan                                       C
C                Research Laboratories, Eastman Kodak Company          C
C                                                                      C
C   Modifications: See Main.                                           C
C                                                                      C
C   Detailed                                                           C
C      description: A well-known sorting algorithm is used.            C
C                   (The code is self-explanatory)                     C
C                                                                      C
C----------------------------------------------------------------------C
```

C         Common Variables

```
          REAL*4          FCMOD
          INTEGER*4       KOUNT
          INTEGER*4       L2
          INTEGER*4       L3
          INTEGER*4       N
          INTEGER*4       NCLOS
          INTEGER*4       NEF(500)
          INTEGER*4       NM1
          INTEGER*4       NP12
          INTEGER*4       NSF(500)
          INTEGER*4       NT
          INTEGER*4       NTT
          REAL*4          SIGP
          REAL*4          SLO
          REAL*4          SRO

COMMON/DATA/ N,NT,F,L2,L3,NM1,NP12,NTT
          COMMON/ORDER/NSF,NEF,KOUNT,FCMOD
          COMMON/PCRTR/SIGP,NCLOS,SLO,SRO
```

C         Local Variable

```
          REAL*4          AUXS            ! A work variable
          REAL*4          AUXE            ! A work variable

DO 10 K=KOUNT,2,-1

DO 20 I=1,K-1                   ! SORT STARTING & END POINTS

IF(NSF(I+1).LT.NSF(I)) THEN

AUXS=NSF(I+1)
             AUXE=NEF(I+1)
             NSF(I+1)=NSF(I)
             NEF(I+1)=NEF(I)
             NSF(I)=AUXS
             NEF(I)=AUXE

END IF

20        CONTINUE

10        CONTINUE
```

C------COMBINE THE CLUSTERS THAT SATISFY THE 'CLOSENESS CRITERIA'

```
          KK=0                    ! COUNTER RESET

DO 25 I=2,KOUNT
          NDIF=NSF(I)-NEF(I-KK-1)
          IF(NDIF.LT.NCLOS) THEN

NEF(I-KK-1)=NEF(I)
             KK=KK+1              ! COUNTER UPDATE

ELSE

NSF(I-KK)=NSF(I)
             NEF(I-KK)=NEF(I)

END IF

25        CONTINUE

KOUNT=KOUNT-KK          ! FINAL # OF CLUSTERS AFTER GROUPING
```

C------PRINT OUT SORTED CLUSTER LOCATIONS. THESE WILL BE USED IN GAIN SETTING

```
          WRITE(L3,100)
```

```
100     FORMAT(10X,'SORTED/GROUPED  HISTOGRAM CLUSTERS',/)

DO 30 I=1,KOUNT
        WRITE(L3,200) NSF(I),NEF(I)
200     FORMAT(/,20X,I4,',',I4,//)
30      CONTINUE

RETURN
        END
C------------------------------------------------------------------C
C                       SUBROUTINE CGAIN                           C
C------------------------------------------------------------------C
C                                                                  C
C       Purpose  : To determine the gain for CHEST exams           C
C                                                                  C
C       Author   : M. Ibrahim Sezan                                C
C                  Research Laboratories, Eastman Kodak Company    C
C                  November 19, 1985                               C
C                                                                  C
C  Modifications: See Main.                                        C
C                                                                  C
C  Subprograms                                                     C
C     called     : HISMAX,HSRCH                                    C
C                                                                  C
C  Detailed                                                        C
C   description : The following rules are used to determine the    C
C                 gain:                                            C
C                                                                  C
C                 1) If the histogram is unimodal then the gain    C
C                    is set such that NEF(1) is mapped to code     C
C                    value MCUNI. G=MCUNI/NEF(1)                   C
C                                                                  C
C                 2) If the histogram is not unimodal:             C
C                                                                  C
C                   2.1) If at least "P2" % of the total # of code C
C                        values lie  after  the code value at      C
C                        which the second cluster starts then the  C
C                        gain is determined by the "PPER" % rule.  C
C                        (P2=25 ,PPER=PPER1=1 )                    C
C                        (P2=55 for LATERAL)                       C
C                                                                  C
C                        THE "PPER" % rule:                        C
C                                                                  C
C                        .The local maxima of the histogram in the C
C                         interval [NSF(2),NEF(2)] is determined:  C
C                         MAX( HIS[NSF(2),NEF(2)] ) = MAXH         C
C                                                                  C
C                        . The code value NCOD where the histogram C
C                          reaches at  PPER % of  MAXH is located  C
C                          (search begins at the code value where  C
C                           the global maxima is attained). Then   C
C                        .  G=MCPER/NCOD                           C
C                                                                  C
C                   2.2) If the percentage of code values that lie C
C                        after  the  code  value at  which the     C
C                        second cluster starts is between "P1" and C
C                        "P2" (P1<P2) then the gain is determined  C
C                        by the "PPER" % rule.                     C
C                        (P1=15,P2=25  and PPER=PPER2=2 )           C
C                        (P1=45,P2=55 for LATERALS)                C
C                                                                  C
C                   2.3) If the percentage of the code values that C
C                        lie after the code value at which the     C
C                        second cluster starts is less than "P1" % C
C                        of the total # of code values (P1=15) then C
C                        the gain is set by the following rules:   C
C                                                                  C
C                        2.3.1 . If X-rays are coned:              C
C                                                                  C
C                                the gain is determined  by the    C
C                                "PPER" % rule. (PPER=1 will be    C
C                                used in the subroutine)           C
C                                                                  C
C                        2.3.2 . If X-rays are not coned:          C
C                                                                  C
C                                2.3.2.a . Histogram bimodal:      C
```

```
C                                  IF the percent population at        C
C                                  CVMAX is larger than 20 % THEN      C
C                                                                      C
C                           2.3.2.a.1.  The gain is set such that      C
C                                       NEF(2) is mapped to code value C
C                                       MCNCON. G=MCNCON/NEF(2)        C
C                                                                      C
C                                  ELSE                                C
C                                                                      C
C                           2.3.2.a.2.  IF the slope of the cdf        C
C                                       between NEF(1) and NSF(2) is   C
C                                       larger than a predetermined    C
C                                       threshold THEN                 C
C                                                                      C
C                           2.3.2.a.2.1.  The gain is set such that    C
C                                         NSF(2) is mapped to code     C
C                                         value MCNCON.                C
C                                         G=MCNCON/NSF(2)              C
C                                                                      C
C                                    ELSE                              C
C                                                                      C
C                           2.3.2.a.2.2.  The gain is set such that    C
C                                         CCVX= K1*NEF(1) + K2*NSF(2)  C
C                                         is mapped to code value      C
C                                         MCNCON.                      C
C                                         G=MCNCON/CCVX                C
C                                                                      C
C                        2.3.2.b . Histogram not bimodal:              C
C                                                                      C
C                                  The gain is set such that           C
C                                  NSF(2) is mapped to code            C
C                                  value MCNCON. G=MCNCON/NEF(2)       C
C                                                                      C
C----------------------------------------------------------------------C
```

C       Common Variables

```
        REAL*4           CIN(10000)
        REAL*4           COUT(0:4095)
        REAL*4           CSM(10000)
        CHARACTER*1      CONED
        REAL*4           CUMDF(0:4095)
        INTEGER*4        CVMAX1
        REAL*4           FCMOD
        INTEGER*4        IHIS(0:4095)
        INTEGER*4        JJ
        INTEGER*4        KCOUNT(2)
        INTEGER*4        KOUNT
        INTEGER*4        L3
        INTEGER*4        MCNCON
        INTEGER*4        MCPER
        INTEGER*4        MCUNI
        INTEGER*4        N
        INTEGER*4        NE(500,2)
        INTEGER*4        NEF(500)
        INTEGER*4        NM1
        INTEGER*4        NP12
        INTEGER*4        NS(500,2)
        INTEGER*4        NSEPR
        INTEGER*4        NSF(500)
        INTEGER*4        NSTOP
        INTEGER*4        NT
        INTEGER*4        NTT
        INTEGER*4        PROJEC
```

C       Output Variable

```
        REAL*4           G          ! FINAL READ-OUT GAIN
```

C       Local variables

```
      REAL*4          CCVX          ! CONVEX COMBINATION POINT BETWEEN CLUSTERS
      REAL*4          K1            ! 1ST CONVEX COMBINATION COEFFICIENT
      REAL*4          K2            ! 2ND CONVEX COMBINATION COEFFICIENT
                                    ! (K1+K2=1.0)......

INTEGER*4       MAXH
      INTEGER*4       MAXHC
      INTEGER*4       NCOD
      INTEGER*4       NSV
      REAL*4          P1
      REAL*4          P2
      REAL*4          PCVMAX
      REAL*4          PPER1
      REAL*4          PPER2
      CHARACTER*1     RULES
      REAL*4          SLOPE
      REAL*4          THRESH

COMMON/CGCRT/MCPER,MCNCON,MCUNI,PROJEC
      COMMON/CONE/CONED
      COMMON/CDF/CIN,CSM,COUT,CUMDF,IHIS
      COMMON/DATA/N,NT,F,L2,L3,NM1,NP12,NTT
      COMMON/ORDER/NSF,NEF,KOUNT,FCMOD
      COMMON/PEAK/NS,NE,NSTOP,CVMAX1,JJ,KCOUNT
      COMMON/GAIN/G

C------CRITERIA OTHER THAN THE USER SPECIFIED

IF(PROJEC.EQ.1) THEN          ! LATERAL Chest
        P1=45.0/100.
        P2=55.0/100.
        THRESH=0.8                  ! THRESHOLD FOR SLOPE TEST
        K1=0.5
        K2=0.5
      ELSE
        P1=15.0/100.
        P2=25.0/100.
        THRESH=0.8
        K1=0.5
        K2=0.5
      END IF

PPER1=1.0/100.
      PPER2=2.0/100.
C

IF(KOUNT.EQ.1) THEN     ! UNIMODAL  P-SCAN HISTOGRAM .......

WRITE(L3,100)
100   FORMAT(2X,'HISTOGRAM IS UNIMODAL: ',/)
      G=FLOATJ(MCUNI)/FLOATJ(NEF(1))
      WRITE(L3,*) ' G= ', G
C------OPTIONAL RULE DESCRIPTION FOR USER---------------------------------
      TYPE *,' < YOU CAN HAVE A BRIEF DESCRIPTION OF THE RULE USED >'
      TYPE 1000
1000  FORMAT(' DO YOU WANT THE RULE DESCRIPTION? (Y/N)',T55,'*',$)
      ACCEPT 1010,RULES
1010  FORMAT(A)

IF((RULES.EQ.'Y').OR.(RULES.NE.'N')) THEN

WRITE(L3,*)' '
        WRITE(L3,*)'>> If the histogram is unimodal then the gain is set'
        WRITE(L3,*)'   such that the end point of the histogram cluster'
        WRITE(L3,*)'   is mapped to CV=', MCUNI
        WRITE(L3,*)'   [RULE: CHEST (1)] '

END IF
C--------------------------------------------------------------------------
      RETURN

END IF
```

```
C------HISTOGRAM IS NOT UNIMODAL

C------RULE 2.1

IF((CUMDF(CVMAX1)-CUMDF(NSF(2))) .GE. P2 ) THEN

! "PPER" RULE
                                          ! PPER=PPER1
        NLOW=NSF(2)
        NUP=NEF(2)
        CALL HISMAX(NLOW,NUP,MAXH,MAXHC)
        WRITE(L3,200)MAXH,MAXHC
200     FORMAT(2X,'HMAX= ',I6,5X,' AT',I8,/)
        NSV=JIFIX(PPER1*FLOATJ(MAXH))
        CALL HSRCH(NSV,MAXHC,NCOD)
        G=FLOATJ(MCPER)/FLOATJ(NCOD)
        WRITE(L3,*) ' G= ',G

C------OPTIONAL RULE DESCRIPTION FOR USER----------------------------------

TYPE *,' <YOU CAN HAVE A BRIEF DESCRIPTION OF THE RULE USED>'
        TYPE 2000
2000    FORMAT(' DO YOU WANT THE RULE DESCRIPTION? (Y/N)',T55,'*',$)
        ACCEPT 1010,RULES
        IF((RULES.EQ.'Y').OR.(RULES.NE.'N'))   THEN

P2=P2*100.
           PPER1=PPER1*100.
           WRITE(L3,*) ' '
           WRITE(L3,*) ' >> If at least P2% of the total # of code values'
           WRITE(L3,*) '    lie after the code value at which the second'
           WRITE(L3,*) '    cluster starts then the gain is determined by'
           WRITE(L3,*) '    the PPER1 percent rule  (see routine CGAIN for'
           WRITE(L3,*) '    detailed description) P2= ',P2,' PPER1= ',PPER1
           WRITE(L3,*) '    [RULE: CHEST (2.1)]'

END IF
C--------------------------------------------------------------------------
        RETURN

END IF

C------RULE: 2.2

IF(((CUMDF(CVMAX1)-CUMDF(NSF(2))) .GT. P1 ).AND.
     $   ((CUMDF(CVMAX1)-CUMDF(NSF(2))) .LT. P2 ))     THEN

! "PPER" RULE
                                          ! PPER=PPER2
        NLOW=NSF(2)
        NUP=NEF(2)
        CALL HISMAX(NLOW,NUP,MAXH,MAXHC)
        WRITE(L3,300) MAXH,MAXHC
300     FORMAT(2X,' HMAX= ',I6,5X,' AT=',I8,/)
        NSV=JIFIX(PPER2*FLOATJ(MAXH))
        CALL HSRCH(NSV,MAXHC,NCOD)
        G=FLOATJ(MCPER)/FLOATJ(NCOD)
        WRITE(L3,*) ' G= ',G

C------OPTIONAL RULE DESCRIPTION FOR USER----------------------------------

TYPE *,' < YOU CAN HAVE A BRIEF DESCRIPTION OF THE RULE USED >'
        TYPE 3000
3000    FORMAT(' DO YOU WANT THE RULE DESCRIPTION? (Y/N)',T55,'*',$)
        ACCEPT 1010,RULES
        IF((RULES.EQ.'Y').OR.(RULES.NE.'N'))   THEN

P2=P2*100.
           PPER2=PPER2*100.
           WRITE(L3,*) ' '
           WRITE(L3,*) ' >> If the percentage of code values that lie'
           WRITE(L3,*) '    after the code value at which the second '
           WRITE(L3,*) '    cluster starts is between P1 and P2  (P1<P2)'
```

```
              WRITE(L3,*) '      then the gain is determined by the PPER2 % rule'
              WRITE(L3,*) '      (see routine CGAIN for detailed description)'
              WRITE(L3,*) '      P1= ',P1,'P2= ',P2,'    PPER2= ',PPER2
              WRITE(L3,*) '      [RULE: CHEST(2.2) ]'

END IF
C------------------------------------------------------------------------
            RETURN

END IF

C-------RULE : 2.3

IF(CONED.EQ.'Y') THEN
                                  ! PPER=PPER1

NLOW=NSF(2)
            NUP=NEF(2)
            CALL HISMAX(NLOW,NUP,MAXH,MAXHC)
            WRITE(L3,400) MAXH,MAXHC
400         FORMAT(2X,'HMAX= ',I6,5X,' AT=',I8,/)
            NSV=JIFIX(PPER1*FLOATJ(MAXH))
            CALL HSRCH(NSV,MAXHC,NCOD)
            G=FLOATJ(MCPER)/FLOATJ(NCOD)
            WRITE(L3,*) ' G= ',G

C------OPTIONAL RULE DESCRIPTION FOR USERS-------------------------------

TYPE *,' < YOU CAN HAVE A BRIEF DESCRIPTION OF THE RULE USED >'
        TYPE 4000
4000    FORMAT(' DO YOU WANT THE RULE DESCRIPTION? (Y/N)',T55,'*',$)
        ACCEPT 1010,RULES
        IF((RULES.EQ.'Y').OR.(RULES.NE.'N')) THEN

P1=P1*100.
            PPER1=PPER1*100.
            WRITE(L3,*)' '
            WRITE(L3,*)' >> If the percentage of the code values that lie'
            WRITE(L3,*)'    after the code value at which the second cluster'
            WRITE(L3,*)'    starts is less than  P1 % of the code values and'
            WRITE(L3,*)'    the X-rays are coned then the gain is determined'
            WRITE(L3,*)'    by the PPER1 % rule (see routine CGAIN for '
            WRITE(L3,*)'    detailed description)',' P1= ',P1,' PPER1= ',PPER1
            WRITE(L3,*)'    [RULE CHEST(2.3.1)] '

END IF
C------------------------------------------------------------------------
            RETURN

ELSE                    ! X-RAYS ARE NOT CONED

IF(KOUNT.EQ.2) THEN        ! BIMODAL HISTOGRAM ........

WRITE(L3,500)
500           FORMAT(2X,'HISTOGRAM IS BIMODAL',/)

PCVMAX=1.0-CUMDF(CVMAX1)
              IF(PCVMAX.GE.0.20) THEN     ! Added (june 16,87) @ PITTS.
                G=FLOATJ(MCNCON)/FLOATJ(NEF(2))
                WRITE(L3,*)' G= ',G

C-----OPTIONAL RULE DESCRIPTION FOR USERS-------------------------------

TYPE *,' < YOU CAN HAVE A BRIEF DESCRIPTION OF THE RULE USED >'
        TYPE 5000
5000    FORMAT(' DO YOU WANT THE RULE DESCRIPTION? (Y/N)',T55,'*',$)
        ACCEPT 1010,RULES

IF((RULES.EQ.'Y').OR.(RULES.NE.'N')) THEN

P1=P1*100.
            WRITE(L3,*) ' '
```

```
              WRITE(L3,*) ' >> If the percentage of the code values that lie'
              WRITE(L3,*) '    after the code value at which the second'
              WRITE(L3,*) '    cluster starts is less than P1 % of the code'
              WRITE(L3,*) '    values and X-rays are not coned, and the'
              WRITE(L3,*) '    histogram is bimodal, and the percentage at'
              WRITE(L3,*) '    CVMAX is GREATER than 20% then the gain'
              WRITE(L3,*) '    is set such that the end point of the'
              WRITE(L3,*) '    second cluster is mapped to CV= ',MCNCON
              WRITE(L3,*) '    P1= ',P1
              WRITE(L3,*) '    [RULE: CHEST(2.3.2.a.1) ]'

END IF
C--------------------------------------------------------------------------
          RETURN

ELSE                         ! PERCENTAGE AT CVMAX <  20 ....

SLOPE= (CUMDF(NSF(2))-CUMDF(NEF(1)))/(NSF(2)-NEF(1))
            SLOPE=SLOPE*10000.
            WRITE(L3,*)' ---->> SLOPE= ',SLOPE,'THRESH= ',THRESH
            IF(SLOPE.GT.THRESH) THEN
              G=FLOATJ(MCNCON)/FLOATJ(NSF(2))
              WRITE(L3,*)' G= ',G

C-----OPTIONAL RULE DESCRIPTION FOR USERS-----------------------------------

TYPE *,' < YOU CAN HAVE A BRIEF DESCRIPTION OF THE RULE USED >'
             TYPE 6000
6000         FORMAT(' DO YOU WANT THE RULE DESCRIPTION? (Y/N)',T55,'*',$)
             ACCEPT 1010,RULES

IF((RULES.EQ.'Y').OR.(RULES.NE.'N')) THEN

P1=P1*100.
                WRITE(L3,*) ' '
                WRITE(L3,*) ' >> If the percentage of the code values that lie'
                WRITE(L3,*) '    after the code value at which the second'
                WRITE(L3,*) '    cluster starts is less than P1 % of the code'
                WRITE(L3,*) '    values and X-rays are not coned, and the '
                WRITE(L3,*) '    histogram is bimodal, and the percentage at'
                WRITE(L3,*) '    CVMAX is LESS than 20%, AND the slope'
                WRITE(L3,*) '    of the cdf between NEF(1) and NSF(2) is'
                WRITE(L3,*) '    GREATER than an a priori threshold then'
                WRITE(L3,*) '    the gain is set such that the start'
                WRITE(L3,*) '    point of the second cluster is'
                WRITE(L3,*) '    mapped to CV= ',MCNCON
                WRITE(L3,*) '    P1= ',P1
                WRITE(L3,*) '    [RULE: CHEST(2.3.2.a.2.1) ]'

END IF
C--------------------------------------------------------------------------
          RETURN
          ELSE

CCVX= K1*NEF(1) + K2*NSF(2)
            G=FLOATJ(MCNCON)/CCVX
            WRITE(L3,*)' G= ',G

C-----OPTIONAL RULE DESCRIPTION FOR USERS-----------------------------------

TYPE *,' < YOU CAN HAVE A BRIEF DESCRIPTION OF THE RULE USED >'
             TYPE 6100
6100         FORMAT(' DO YOU WANT THE RULE DESCRIPTION? (Y/N)',T55,'*',$)
             ACCEPT 1010,RULES

IF((RULES.EQ.'Y').OR.(RULES.NE.'N')) THEN

P1=P1*100.
                WRITE(L3,*) ' '
                WRITE(L3,*) ' >> If the percentage of the code values that lie'
                WRITE(L3,*) '    after the code value at which the second'
                WRITE(L3,*) '    cluster starts is less than P1 % of the code'
                WRITE(L3,*) '    values and X-rays are not coned, and the '
                WRITE(L3,*) '    histogram is bimodal, and the percentage at'
                WRITE(L3,*) '    CVMAX is LESS than 20%, AND the slope'
```

```
              WRITE(L3,*) '   of the cdf between NEF(1) and NSF(2) is'
              WRITE(L3,*) '   LESS than an a priori threshold then'
              WRITE(L3,*) '   the gain is set such that the point'
              WRITE(L3,*) '   CCVX=K1*NEF(1)+K2*NSF(2) is mapped'
              WRITE(L3,*) '   to CV= ',MCNCON
              WRITE(L3,*) '   P1= ',P1
              WRITE(L3,*) '   [RULE: CHEST(2.3.2.a.2.2) ]'

END IF
C------------------------------------------------------------------------
          RETURN
          END IF

END IF

ELSE                  ! HISTOGRAM IS NOT BIMODAL ......

G=FLOATJ(MCNCON)/FLOATJ(NSF(2))      ! Feb. 23 change.....
      WRITE(L3,*) ' G= ',G

C------OPTIONAL RULE DESCRIPTION FOR USER--------------------------------

TYPE *,' < YOU CAN HAVE A BRIEF DESCRIPTION OF THE RULE USED >'
      TYPE 7000
7000  FORMAT(' DO YOU WANT THE RULE DESCRIPTION? (Y/N)',T55,'*',$)
      ACCEPT 1010,RULES
      IF((RULES.EQ.'Y').OR.(RULES.NE.'N')) THEN

P1=P1*100.
          WRITE(L3,*) ' '
          WRITE(L3,*) ' >> If the percentage of the code values that lie'
          WRITE(L3,*) '    after the code value at which the second cluster'
          WRITE(L3,*) '    starts is less than P1 % of the code values and'
          WRITE(L3,*) '    X-rays are not coned, and the histogram is not'
          WRITE(L3,*) '    bimodal then the gain is set such that the'
          WRITE(L3,*) '    start point of the second cluster is mapped'
          WRITE(L3,*) '    to CV= ',MCNCON
          WRITE(L3,*) '    P1= ',P1
          WRITE(L3,*) '    [RULE: CHEST(2.3.2.b) ]'

END IF
C------------------------------------------------------------------------
      RETURN

END IF

END IF

RETURN

END
C------------------------------------------------------------------------C
                     SUBROUTINE EGAIN
C------------------------------------------------------------------------C
C                                                                        C
C    Purpose: To determine the gain for EXTREMITIES exams.               C
C                                                                        C
C    Author : M. Ibrahim Sezan                                           C
C             Research Laboratories, Eastman Kodak Company               C
C             November 19, 1985                                          C
C                                                                        C
C Modifications: Major overhaul March 4, 1988....                        C
C             For future changes see Main.                               C
C                                                                        C
C Subprograms                                                            C
C     called   : None                                                    C
C                                                                        C
C Detailed                                                               C
C  description : The following rules are used to determine the gain:     C
C                                                                        C
C                1) If the histogram is unimodal:                        C
C                                                                        C
C                   1.1) If x-rays are coned                             C
```

```
                The gain is set such that NEF(1) is
                mapped to code value MEUNIC.
                G=MEUNIC/NEF(1)
                (NEF(1) is the end point of the histogram
                cluster)

1.2) If x-rays are not coned

IF the percentage of code values that
                will be clipped at 4095 ('tail' %)
                is GREATER than PER_T % THEN 1.2.a. The gain is set such that the last
                       1% of the tail is clipped ELSE
                1.2.b. The gain is set such that NEF(1)
                       is mapped to code value MEUNI.
                       G=MEUNI/NEF(1)

2) If the histogram is not unimodal:

2.1) If X-rays are coned
             The gain is set such that NEF(L) is mapped
             to code value MECON.  G=MECON/NEF(L)
             ( NEF(L) is the end point of the Last
             cluster )

2.2) If X-rays are not coned 2.2.1) If the histogram is bimodal

IF the slope of the cdf between
                        NEF(1) and NSF(2) is GREATER than a
                        predetermined threshold THEN IF The percentage of CV's
                                between NEF(2) and CV=CVMAX-1
                                ('tail' percentage)
                                is GREATER than PER_T % THEN 2.2.1.a.1. The gain is set such that
                                   the last 1% of the tail is
                                   clipped
                                ELSE
                        2.2.1.a.2. The gain is set such that
                                   NEF(2) is mapped to MENCON.
                                   G=MENCON/NEF(2)

ELSE 2.2.1.b. The gain is set such that
                                 CCVX=K1*NEF(1)+K2*NSF(2)
                                 is mapped to code value MENCON 2.2.2) IF the histogram has more than two
                       clusters IF the slope of the cdf between
                        NEF(2) and NSF(3) is GREATER than a
                        predetermined threshold THEN IF The percentage of CV's
                                between NEF(3) and CV=CVMAX-1
                                ('tail' percentage)
                                is GREATER than PER_T % THEN
                        2.2.2.a.1. The gain is set such that
                                   the last 1% of the 'tail' is
                                   clipped
                                ELSE
                        2.2.2.a.2. The gain is set such that
                                   NEF(3) is mapped to MENCON.
                                   G=MENCON/NEF(3).
```

```
C                              ELSE                                    C
C                                                                      C
C                                 IF the slope of the cdf between      C
C                                 NEF(1) and NSF(2) is GREATER         C
C                                 than a predetermined threshold       C
C                                 THEN                                 C
C                              2.2.2.b.a. The gain is set such that    C
C                                     CCVX=K1*NEF(2)+K2*NSF(3)         C
C                                     is mapped to MENCON.             C
C                                     G=MENCON/CCVX                    C
C                                                                      C
C                                 ELSE                                 C
C                                                                      C
C                                    IF 2nd cluster is closer to       C
C                                    3rd                               C
C                                    THEN                              C
C                                                                      C
C                                       IF KOUNT=3 THEN                C
C                              2.2.2.b.b.1.a. The gain is set such     C
C                                       that CCVX=K1*NEF(1)+           C
C                                       K2*NSF(2) is mapped            C
C                                       to MENCON.                     C
C                                       G=MENCON/CCVX.                 C
C                                                                      C
C                                       IF KOUNT=4 THEN                C
C                              2.2.2.b.b.1.b.  G=MENCON/NSF(3)         C
C                                                                      C
C                                       IF KOUNT >4 THEN               C
C                              2.2.2.b.b.1.c.  G=MENCON/NEF(3)         C
C                                                                      C
C                                    ELSE                              C
C                              2.2.2.b.b.2. The gain is set such       C
C                                       that CCVX=K1*NEF(2)+           C
C                                       K2*NSF(3) is mapped            C
C                                       to MENCON.                     C
C                                       G=MENCON/CCVX.                 C
C                                                                      C
C----------------------------------------------------------------------C
C PER_T= UPPER BOUND ON 'SAFE' TAIL PERCENTAGE..                       C
C                                                                      C
C----------------------------------------------------------------------C C       Common Variables
        REAL*4          CIN(10000)
        REAL*4          COUT(0:4095)
        REAL*4          CSM(10000)
        CHARACTER*1     CONED
        REAL*4          CUMDF(0:4095)
        INTEGER*4       CVMAX1
        INTEGER*4       IHIS(0:4095)
        INTEGER*4       JJ
        INTEGER*4       KCOUNT(2)
        INTEGER*4       F
        REAL*4          FCMOD
        INTEGER*4       KOUNT
        INTEGER*4       L2
        INTEGER*4       L3
        INTEGER*4       MECON
        INTEGER*4       MENCON
        INTEGER*4       MEUNI
        INTEGER*4       MEUNIC
        INTEGER*4       N
        INTEGER*4       NE(500,2)
        INTEGER*4       NEF(500)
        INTEGER*4       NM1
        INTEGER*4       NP12
        INTEGER*4       NS(500,2)
        INTEGER*4       NSF(500)
        INTEGER*4       NSTOP
        INTEGER*4       NT
        INTEGER*4       NTT
```

```
      COMMON/EGCRT/MECON,MENCON,MEUNI,MEUNIC
      COMMON/CDF/CIN,CSM,COUT,CUMDF,IHIS
      COMMON/CONE/CONED
      COMMON/DATA/N,NT,F,L2,L3,NM1,NP12,NTT
      COMMON/ORDER/NSF,NEF,KOUNT,FCMOD
      COMMON/PEAK/NS,NE,NSTOP,CVMAX1,JJ,KCOUNT
      COMMON/GAIN/G
C     Local Variable REAL*4          CCVX      ! CONVEX COMBINATION POINT BETWEEN CLUSTERS
      REAL*4          K1        ! 1ST CONVEX COMBINATION COEFFICIENT
      REAL*4          K2        ! 2ND CONVEX COMBINATION COEFFICIENT
                                ! (K1+K2=1.0)......

CHARACTER*1     RULES
      REAL*4          SLOPE
      REAL*4          THRESH
      REAL*4          PER_T     ! UPPER BOUND ON 'SAFE' TAIL PERCENTAGE
      REAL*4          PER_1     ! CUMDF(CVMAX1)-0.01
      REAL*4          PTAIL     ! TAIL PERCENTAGE
      INTEGER*4       TAIL_1    ! CODE VALUE AT WHICH THE LAST 1% OF
                                ! THE TAIL STARTS
      INTEGER*4       N4095     ! CODE VALUE TO BE MAPPED TO 4095 BY
                                ! MEUNI FOR UNIMODAL HISTOGRAM

C     Output Variable

REAL*4          G

C--------PREDETERMINED CRITERIA

K1=0.4
      K2=0.6
      PER_T=2.0
      THRESH=2.0
C----------------------------

IF(KOUNT.EQ.1) THEN              ! UNIMODAL P-SCAN HISTOGRAM

WRITE(L3,100)
100      FORMAT(2X,'HISTOGRAM IS UNIMODAL: ',/)

IF(CONED.EQ.'Y') THEN

G=FLOATJ(MEUNIC)/FLOATJ(NEF(1))
            WRITE(L3,*) '   G= ', G

C-----OPTIONAL RULE DESCRIPTION FOR USER-----------------------------------

TYPE *,' < YOU CAN HAVE A BRIEF DESCRIPTION OF THE RULE USED >'
            TYPE 1000
1000        FORMAT(' DO YOU WANT THE RULE DESCRIPTION? (Y/N)',T55,'*',$)
            ACCEPT 1010,RULES
1010        FORMAT(A)

IF((RULES.EQ.'Y').OR.(RULES.NE.'N')) THEN

WRITE(L3,*)' '
               WRITE(L3,*)'  >> If the histogram is unimodal, and X-rays are '
               WRITE(L3,*)'     coned then the gain is set such that the end'
               WRITE(L3,*)'     point of the histogram cluster is mapped to '
               WRITE(L3,*)'     CV= ', MEUNIC
               WRITE(L3,*)'     [RULE: EXTREMITY (1.1) ]'

END IF
C-------------------------------------------------------------------------
            RETURN

ELSE

C-------TAIL PROCESSING ??????

N4095=FLOATJ(NEF(1))*4095./FLOATJ(MEUNI)
            PTAIL=CUMDF(CVMAX1)-CUMDF(N4095)
            PTAIL=PTAIL*100.
```

```
                WRITE(L3,*) ' TAIL PERCENTAGE = ',PTAIL
                IF(PTAIL.GT.PER_T) THEN    ! TAIL BEYOND TOLERANCE

C------BEGIN TAIL PROCESSING.................

PER_1=CUMDF(CVMAX1)-0.01
                    DO 10 I=N4095,CVMAX1
                    IF(CUMDF(I).GE.PER_1) THEN
                    TAIL_1=I
                                                    ! THE VALUE BEYOND WHICH
                                                    ! THE CODE VALUES WILL BE
                                                    ! CLIPPED WHEN GAIN IS SET..
                                                    ! THE LAST 1% OF THE TAIL
                                                    ! STARTS AT TAIL_1

WRITE(L3,*) ' CV_START OF 1% TAIL',TAIL_1
                    GO TO 15
                    END IF

10                  CONTINUE

15                  G=4095.0/FLOATJ(TAIL_1)
                    WRITE(L3,*) ' G= ',G
C-------------------------RULE
                        WRITE(L3,*)' RULE E[(1.2.a)] '
                    RETURN

ELSE                          ! PTAIL < PER_T

G=FLOATJ(MEUNI)/FLOATJ(NEF(1))
                    WRITE(L3,*) ' G= ',G
C-------------------------RULE
                        WRITE(L3,*)' RULE E[(1.2.b)] '
                    RETURN

END IF
C-------END OF TAIL PROCESSING.................

END IF

END IF

C------END OF RULE 1...

C------HISTOGRAM IS NOT UNIMODAL................

IF(CONED.EQ.'Y') THEN                ! CONED X-RAYS

G=FLOATJ(MECON)/FLOATJ(NEF(KOUNT))
          IF(G.LT.1.0) G=1.0                 ! IF NEF(KOUNT)>MECON ~ G=1.0
          WRITE(L3,*) ' G= ',G

C-----OPTIONAL RULE DESCRIPTION FOR USER-----------------------------------

TYPE *,' < YOU CAN HAVE A BRIEF DESCRIPTION OF THE RULE USED >'
          TYPE 2000
2000      FORMAT(' DO YOU WANT THE RULE DESCRIPTION? (Y/N)',T55,'*',$)
          ACCEPT 1010,RULES
          IF((RULES.EQ.'Y').OR.(RULES.NE.'N')) THEN

WRITE(L3,*) ' '
            WRITE(L3,*) ' >> If the histogram is not unimodal and X-rays are'
            WRITE(L3,*) '    coned then the gain is set such that the end'
            WRITE(L3,*) '    point of the last cluster is mapped to CV= ',MECON
            WRITE(L3,*) '    [RULE: EXTREMITY (2.1) ]'

END IF
C--------------------------------------------------------------------------
          RETURN
          END IF

IF(KOUNT.EQ.2) THEN                  ! HISTOGRAM IS BIMODAL...
```

```
            SLOPE=(CUMDF(NSF(2))-CUMDF(NEF(1)))/(NSF(2)-NEF(1))
            SLOPE=SLOPE*10000.
            WRITE(L3,*)' --->> SLOPE= ',SLOPE,'THRESH= ',THRESH
            IF(SLOPE.GT.THRESH) THEN    ! 2ND CLUSTER POSSIBLY CONTAINS
                                        ! ANATOMY

C------TAIL PROCESSING ??????

PTAIL=CUMDF(CVMAX1)-CUMDF(NEF(2))
            PTAIL=PTAIL*100.
            WRITE(L3,*) ' TAIL PERCENTAGE = ',PTAIL
            IF(PTAIL.GT.PER_T) THEN    ! TAIL BEYOND TOLERANCE

C------BEGIN TAIL PROCESSING..................

PER_1=CUMDF(CVMAX1)-0.01
            DO 30 I=NEF(2),CVMAX1
            IF(CUMDF(I).GE.PER_1) THEN
            TAIL_1=I
                                        ! THE VALUE BEYOND WHICH
                                        ! THE CODE VALUES WILL BE
                                        ! CLIPPED WHEN GAIN IS SET..
                                        ! THE LAST 1% OF THE TAIL
                                        ! STARTS AT TAIL_1

WRITE(L3,*) ' CV_START OF 1% TAIL',TAIL_1
            GO TO 35
            END IF

30          CONTINUE
C-------END OF TAIL PROCESSING..................
35             G=FLOATJ(MENCON)/FLOATJ(TAIL_1)
            ; WRITE(L3,*) ' G= ',G
C-----------------------RULE
                    WRITE(L3,*)' RULE E[(2.2.1.a.1)] '
            RETURN
        ELSE

G=FLOATJ(MENCON)/FLOATJ(NEF(2))
            WRITE(L3,*) ' G= ',G
C-----------------------RULE
                    WRITE(L3,*)' RULE E[(2.2.1.a.2)] '
            RETURN

END IF

ELSE                ! SLOPE < THRESH........
                            ! 2ND CLUSTER IS POSSIBLY BACKGROUND

CCVX= K1*NEF(1) + K2*NSF(2)
        G=FLOATJ(MENCON)/CCVX
        IF(G.LT.1.0) G=1.0       ! IF NEF(KOUNT)>MENCON ~ G=1.0
        WRITE(L3,*) ' G= ',G
C-----------------RULE
                WRITE(L3,*)' RULE E[(2.2.1.b)] '
        RETURN

END IF

ELSE                ! HISTOGRAM IS NOT BIMODAL .......

SLOPE=(CUMDF(NSF(3))-CUMDF(NEF(2)))/(NSF(3)-NEF(2))
        SLOPE=SLOPE*10000.
        WRITE(L3,*)' --->> (2-3)SLOPE= ',SLOPE,'THRESH= ',THRESH

IF(SLOPE.GT.THRESH) THEN    ! 2ND--3RD CLUSTER SLOPE > THRESH
                                    ! 3RD CLUSTER POSSIBLY CONTAINS
                                    ! ANATOMY

C------TAIL PROCESSING ??????

PTAIL=CUMDF(CVMAX1)-CUMDF(NEF(3))
            PTAIL=PTAIL*100.
```

```
              WRITE(L3,*) ' TAIL PERCENTAGE = ',PTAIL
              IF(PTAIL.GT.PER_T) THEN    ! TAIL BEYOND TOLERANCE

C------BEGIN TAIL PROCESSING................
              PER_1=CUMDF(CVMAX1)-0.01
              DO 40 I=NEF(3),CVMAX1
              IF(CUMDF(I).GE.PER_1) THEN
              TAIL_1=I
                                              ! THE VALUE BEYOND WHICH
                                              ! THE CODE VALUES WILL BE
                                              ! CLIPPED WHEN GAIN IS SET..
                                              ! THE LAST 1% OF THE TAIL
                                              ! STARTS AT TAIL_1
              WRITE(L3,*) ' CV_START OF 1% TAIL',TAIL_1
              GO TO 45
              END IF

40            CONTINUE
C-------END OF TAIL PROCESSING................
45            G=FLOATJ(MENCON)/FLOATJ(TAIL_1)
              WRITE(L3,*) ' G= ',G
C------------------------RULE
                  WRITE(L3,*)' RULE E[(2.2.2.a.1)] '
              RETURN

ELSE

G=FLOATJ(MENCON)/FLOATJ(NEF(3))
              WRITE(L3,*) ' G= ',G
C------------------------RULE
                  WRITE(L3,*)' RULE E[(2.2.2.a.2)] '
              RETURN

END IF

ELSE            ! 2ND--3RD CLUSTER SLOPE < THRESH........

! NOW CHECK 1ST--2ND CLUSTER SLOPE ..
           SLOPE=(CUMDF(NSF(2))-CUMDF(NEF(1)))/(NSF(2)-NEF(1))
           SLOPE=SLOPE*10000.
           WRITE(L3,*)' --->> (1-2)SLOPE= ',SLOPE,'THRESH= ',THRESH
           IF(SLOPE.GT.THRESH) THEN
                                   ! 1ST-2ND CLUSTER SLOPE > THRESH...
                                   ! 2ND CLUSTER MAY CONTAIN ANATOMY
              CCVX= K1*NEF(2) + K2*NSF(3)
              G=FLOATJ(MENCON)/CCVX
              IF(G.LT.1.0) G=1.0       ! IF NEF(KOUNT)>MENCON ~ G=1.0
              WRITE(L3,*) ' G= ',G
C------------------------RULE
                  WRITE(L3,*)' RULE E[(2.2.2.b.a)] '
              RETURN

ELSE            ! 1ST--2ND CLUSTER SLOPE < THRESH........

D21=NSF(2)-NEF(1)
              D23=NSF(3)-NEF(2)
              IF(D23.LE.D21) THEN    ! 2ND CLUSTER CLOSER TO 3RD..
                                     ! ==> 2ND CLUSTER MAY BE BACKGROUND..

IF(KOUNT.EQ.3) THEN
                    CCVX= K1*NEF(1) + K2*NSF(2)
                    G=FLOATJ(MENCON)/CCVX
                    IF(G.LT.1.0) G=1.0    ! IF NEF(KOUNT)>MENCON ~ G=1.0
                    WRITE(L3,*) ' G= ',G
C------------------------RULE
                        WRITE(L3,*)' RULE E[(2.2.2.b.b.1.a)] '
                    RETURN
                 END IF

IF(KOUNT.EQ.4) THEN
                    G=FLOATJ(MENCON)/NSF(3)
                    IF(G.LT.1.0) G=1.0    ! IF NEF(KOUNT)>MENCON ~ G=1.0
                    WRITE(L3,*) ' G= ',G
C------------------------RULE
```

```
                    WRITE(L3,*)' RULE E[(2.2.2.b.b.1.b)] '
          RETURN
        END IF

IF(KOUNT.GT.4) THEN
          G=FLOATJ(MENCON)/NEF(3)
          IF(G.LT.1.0) G=1.0          ! IF NEF(KOUNT)>MENCON ~ G=1.0
          WRITE(L3,*) ' G= ',G
C-----------------------RULE
                    WRITE(L3,*)' RULE E[(2.2.2.b.b.1.c)] '
          RETURN
        END IF

ELSE                            ! 2ND CLUSTER CLOSER TO 1ST
                                      ! ==> 2nd CLUSTER MAY CONTAIN ANATOMY
        CCVX= K1*NEF(2) + K2*NSF(3)
        G=FLOATJ(MENCON)/CCVX
        IF(G.LT.1.0) G=1.0            ! IF NEF(KOUNT)>MENCON ~ G=1.0
        WRITE(L3,*) ' G= ',G
C-----------------------RULE
                    WRITE(L3,*)' RULE E[(2.2.2.b.b.2)] '
      END IF

END IF

END IF

END IF

RETURN
    END
C------------------------------------------------------------------------C
                    SUBROUTINE AGAIN
C------------------------------------------------------------------------C
C                                                                        C
C     Purpose: To determine the gain for ABDOMEN  exams.                 C
C                                                                        C
C     Author : M. Ibrahim Sezan                                          C
C              Research Laboratories, Eastman Kodak Company              C
C              November 19, 1985                                         C
C                                                                        C
C Modifications: Major overhaul March 4, 1988....                        C
C                For future changes see Main.                            C
C                                                                        C
C Subprograms                                                            C
C    called    : None                                                    C
C                                                                        C
C Detailed                                                               C
C  description : The following rules are used to determine the gain:     C
C                                                                        C
C                1) If the histogram is unimodal:                        C
C                                                                        C
C                        IF the percentage of code values that           C
C                        will be clipped at 4095 ('tail' %)              C
C                        is GREATER than PER_T % THEN                    C
C                                                                        C
C                     1.a. The gain is set such that the last            C
C                          PER_TCLIP % of the tail is clipped            C
C                                                                        C
C                        ELSE                                            C
C                                                                        C
C                     1.b. IF the tail percentage is LESS                C
C                          than PER_TCLIP % THEN                         C
C                     1.b.1. The gain is set such that at                C
C                            least PER_TCLIP % of the tail is            C
C                            clipped                                     C
C                            ELSE                                        C
C                     1.b.2. The gain is set such that NEF(1)            C
C                            is mapped to code value MAUNI.              C
C                            G=MAUNI/NEF(1)                              C
C                                                                        C
C                2) If the histogram is not unimodal:                    C
C                                                                        C
```

```
2.1) If X-rays are coned
     The gain is set such that NEF(L) is mapped
     to code value MACON.  G=MACON/NEF(L)
     ( NEF(L) is the end point of the Last
       cluster )

2.2) If X-rays are not coned 2.2.1) If the histogram is bimodal

IF the slope of the cdf between
            NEF(1) and NSF(2) is GREATER than a
            predetermined threshold THEN IF The percentage of CV's
                between NEF(2) and CV=CVMAX-1
                ('tail' percentage)
                is GREATER than PER_T % THEN 2.2.1.a.1.  The gain is set such that
                     the last 1PER_TCLIP % of the
                     tail is clipped
                ELSE
         2.2.1.a.2.  The gain is set such that
                     NEF(2) is mapped to MANCON.
                     G=MANCON/NEF(2)

ELSE 2.2.1.b.  The gain is set such that
                   CCVX=K1*NEF(1)+K2*NSF(2)
                   is mapped to code value MANCON 2.2.2) IF the histogram has more than two
            clusters IF the slope of the cdf between
            NEF(2) and NSF(3) is GREATER than a
            predetermined threshold THEN IF The percentage of CV's
                between NEF(3) and CV=CVMAX-1
                ('tail' percentage)
                is GREATER than PER_T % THEN
         2.2.2.a.1.  The gain is set such that
                     the last PER_TCLIP % of the
                     'tail' is clipped
                ELSE
         2.2.2.a.2.  The gain is set such that
                     NEF(3) is mapped to MANCON.
                     G=MANCON/NEF(3).

ELSE

IF the slope of the cdf between
                NEF(1) and NSF(2) is GREATER
                than a predetermined threshold
                THEN
         2.2.2.b.a.  The gain is set such that
                     CCVX=K1*NEF(2)+K2*NSF(3)
                     is mapped to MANCON.
                     G=MANCON/CCVX

ELSE

IF 2nd cluster is closer to
                    3rd THEN 2.2.2.b.b.1.  The gain is set such
                       that CCVX=K1*NEF(1)+
                       K2*NSF(2) is mapped
                       to MANCON.
                       G=MANCON/CCVX.

ELSE
```

```
C                                 2.2.2.b.b.2. The gain is set such    C
C                                              that NSF(3) is mapped   C
C                                              to MANCON.              C
C                                              G=MANCON/NSF(3).        C
C** K1 and K2 are variable (see below)                                 C
C                                              (K1 ,K2 LAST MODIF, 08/9/89)  C
C----------------------------------------------------------------------C
C PER_T= UPPER BOUND ON 'SAFE' TAIL PERCENTAGE..                       C
C                                                                      C
C----------------------------------------------------------------------C C       Common Variables
        REAL*4          CIN(10000)
        REAL*4          COUT(0:4095)
        REAL*4          CSM(10000)
        CHARACTER*1     CONED
        REAL*4          CUMDF(0:4095)
        INTEGER*4       CVMAX1
        INTEGER*4       IHIS(0:4095)
        INTEGER*4       JJ
        INTEGER*4       KCOUNT(2)
        INTEGER*4       F
        REAL*4          FCMOD
        INTEGER*4       KOUNT
        INTEGER*4       L2
        INTEGER*4       L3
        INTEGER*4       MACON
        INTEGER*4       MANCON
        INTEGER*4       MAUNI
        INTEGER*4       N
        INTEGER*4       NE(500,2)
        INTEGER*4       NEF(500)
        INTEGER*4       NM1
        INTEGER*4       NP12
        INTEGER*4       NS(500,2)
        INTEGER*4       NSF(500)
        INTEGER*4       NSTOP
        INTEGER*4       NT
        INTEGER*4       NTT COMMON/AGCRT/MACON,MANCON,MAUNI
        COMMON/CDF/CIN,CSM,COUT,CUMDF,IHIS
        COMMON/CONE/CONED
        COMMON/DATA/N,NT,F,L2,L3,NM1,NP12,NTT
        COMMON/ORDER/NSF,NEF,KOUNT,FCMOD
        COMMON/PEAK/NS,NE,NSTOP,CVMAX1,JJ,KCOUNT
        COMMON/GAIN/G C       Local Variable REAL*4          CCVX        ! CONVEX COMBINATION POINT BETWEEN CLUSTERS
        REAL*4          K1          ! 1ST CONVEX COMBINATION COEFFICIENT
        REAL*4          K2          ! 2ND CONVEX COMBINATION COEFFICIENT
                                    ! (K1+K2=1.0)......
        CHARACTER*1     RULES
        REAL*4          SLOPE
        REAL*4          THRESH
        REAL*4          PER_T       ! UPPER BOUND ON TAIL PERCENTAGE
        REAL*4          PER_TCLIP   ! "SAFE" PERCENTAGE TO CLIP WHEN BOUNDS
                                    ! ARE EXCEEDED. (PER_TCLIP IS ALSO THE
                                    ! LOWER BOUND ON TAIL PERCENTAGE)
        REAL*4          PER_1       ! CUMDF(CVMAX1)-PER_TCLIP
        REAL*4          PTAIL       ! TAIL PERCENTAGE
        INTEGER*4       TAIL_1      ! CODE VALUE AT WHICH THE LAST PER_TCLIP %
                                    ! OF THE TAIL STARTS
        INTEGER*4       N4095       ! CODE VALUE TO BE MAPPED TO 4095 BY
                                    ! MAUNI FOR UNIMODAL HISTOGRAM C       Output Variable

REAL*4          G
```

```
C-------PREDETERMINED CRITERIA
        PER_T=5.0
        THRESH=1.5
        PER_TCLIP=0.005           ! TAIL CLIP CRITERIA
C--------------------------
        IF(KOUNT.EQ.1) THEN                ! UNIMODAL P-SCAN HISTOGRAM
           WRITE(L3,100)
100        FORMAT(2X,'HISTOGRAM IS UNIMODAL: ',/)

C------TAIL PROCESSING ??????
           N4095=FLOATJ(NEF(1))*4095./FLOATJ(MAUNI)
           PTAIL=CUMDF(CVMAX1)-CUMDF(N4095)
           PTAIL=PTAIL*100.
           WRITE(L3,*) ' TAIL PERCENTAGE = ',PTAIL
           IF(PTAIL.GT.PER_T) THEN   ! TAIL BEYOND TOLERANCE

C------BEGIN TAIL PROCESSING..................
              PER_1=CUMDF(CVMAX1)-PER_TCLIP
              DO 10 I=N4095,CVMAX1
              IF(CUMDF(I).GE.PER_1) THEN
                 TAIL_1=I
                                           ! THE VALUE BEYOND WHICH
                                           ! THE CODE VALUES WILL BE
                                           ! CLIPPED WHEN GAIN IS SET..
                                           ! THE LAST PER_TCLIP % OF THE
                                           ! TAIL STARTS AT TAIL_1

WRITE(L3,*) ' CV_START OF', PER_TCLIP,
           +        ' % TAIL',TAIL_1
                 GO TO 15
              END IF

10            CONTINUE

15            G=4095.0/FLOATJ(TAIL_1)
              WRITE(L3,*) ' G= ',G
C--------------------------RULE
                 WRITE(L3,*)' RULE A[(1.a)] '
              RETURN

ELSE                       ! PTAIL < PER_T
              IF(PTAIL.LT.PER_TCLIP*100.) THEN
                                      ! TAIL PERCENTAGE < PER_TCLIP*100 !!!
                 PER_1=CUMDF(CVMAX1)-PER_TCLIP
                 DO 20 I=N4095,0,-1

IF(CUMDF(I).LE.PER_1) THEN
                    TAIL_1=I
                    WRITE(L3,*) ' CV_START OF', PER_TCLIP,
           +           ' % TAIL',TAIL_1
                    GO TO 25
                 END IF

20               CONTINUE
25               G=4095.0/FLOATJ(TAIL_1)
                 WRITE(L3,*) ' G= ',G
C--------------------------RULE
                    WRITE(L3,*)' RULE A[(1.b.1)] '
                 RETURN

ELSE                    ! 1 < PTAIL < PER_T
                 G=FLOATJ(MAUNI)/FLOATJ(NEF(1))
                 WRITE(L3,*) ' G= ',G
C--------------------------RULE
                    WRITE(L3,*)' RULE A[(1.b.2)] '
                 RETURN
              END IF

END IF
```

```
C-------END OF TAIL PROCESSING.................
         END IF

C-------END OF RULE 1...

C-------HISTOGRAM IS NOT UNIMODAL.................

IF(CONED.EQ.'Y') THEN                   ! CONED X-RAYS

G=FLOATJ(MACON)/FLOATJ(NEF(KOUNT))
            IF(G.LT.1.0) G=1.0                   ! IF NEF(KOUNT)>MACON ~ G=1.0
            WRITE(L3,*) ' G= ',G

C-----OPTIONAL RULE DESCRIPTION FOR USER-----------------------------------------

TYPE *,' < YOU CAN HAVE A BRIEF DESCRIPTION OF THE RULE USED >'
            TYPE 2000
2000        FORMAT(' DO YOU WANT THE RULE DESCRIPTION? (Y/N)',T55,'*',$)
            ACCEPT 1010,RULES
1010        FORMAT(A)
            IF((RULES.EQ.'Y').OR.(RULES.NE.'N')) THEN

WRITE(L3,*) ' '
               WRITE(L3,*) ' >> If the histogram is not unimodal and X-rays are'
               WRITE(L3,*) '    coned then the gain is set such that the end'
               WRITE(L3,*) '    point of the last cluster is mapped to CV= ',MACON
               WRITE(L3,*) '    [RULE: ABDOMEN (2.1) ]'
            END IF
C-------------------------------------------------------------------------------
         RETURN
         END IF

IF(KOUNT.EQ.2) THEN                     ! HISTOGRAM IS BIMODAL...

SLOPE=(CUMDF(NSF(2))-CUMDF(NEF(1)))/(NSF(2)-NEF(1))
            SLOPE=SLOPE*10000.
            WRITE(L3,*)' --->> SLOPE= ',SLOPE,'THRESH= ',THRESH
            IF(SLOPE.GT.THRESH) THEN              ! 2ND CLUSTER POSSIBLY CONTAINS
                                                  ! ANATOMY

C-------TAIL PROCESSING ??????

PTAIL=CUMDF(CVMAX1)-CUMDF(NEF(2))
               PTAIL=PTAIL*100.
               WRITE(L3,*) ' TAIL PERCENTAGE = ',PTAIL
               IF(PTAIL.GT.PER_T) THEN            ! TAIL BEYOND TOLERANCE

C-------BEGIN TAIL PROCESSING.................

PER_1=CUMDF(CVMAX1)-PER_TCLIP
                  DO 30 I=NEF(2),CVMAX1
                  IF(CUMDF(I).GE.PER_1) THEN
                  TAIL_1=I
                                                  ! THE VALUE BEYOND WHICH
                                                  ! THE CODE VALUES WILL BE
                                                  ! CLIPPED WHEN GAIN IS SET..
                                                  ! THE LAST PER_TCLIP % OF
                                                  ! THE TAIL STARTS AT TAIL_1

'           WRITE(L3,*) ' CV_START OF',PER_TCLIP,
      +                       '% TAIL',TAIL_1
                  GO TO 35
                  END IF

30                CONTINUE
C-------END OF TAIL PROCESSING.................
35.               G=FLOATJ(MANCON)/FLOATJ(TAIL_1)
                  WRITE(L3,*) ' G= ',G
C-----------------------RULE
                        WRITE(L3,*)' RULE A[(2.2.1.a.1)] '
               RETURN
            ELSE
```

```
                  G=FLOATJ(MANCON)/FLOATJ(NEF(2))
                  WRITE(L3,*) ' G= ',G
C---------------------RULE
                     WRITE(L3,*)' RULE A[(2.2.1.a.2)] '
            RETURN

END IF

ELSE              ! SLOPE < THRESH........
                          ! 2ND CLUSTER IS POSSIBLY BACKGROUND
        IF(SLOPE.LT.0.4) K1=0.5
        IF((SLOPE.GE.0.4).AND.(SLOPE.LT.0.5)) K1=0.4
        IF((SLOPE.GE.0.5).AND.(SLOPE.LT.0.6)) K1=0.3
        IF((SLOPE.GE.0.6).AND.(SLOPE.LT.1.0)) K1=0.2
        IF(SLOPE.GE.1.00) K1=0.1
        K2=1.- K1
        CCVX= K1*NEF(1) + K2*NSF(2)
        G=FLOATJ(MANCON)/CCVX
        IF(G.LT.1.0) G=1.0        ! IF NEF(KOUNT)>MANCON ~ G=1.0
        WRITE(L3,*) ' G= ',G
C--------------------RULE
                     WRITE(L3,*)' RULE A[(2.2.1.b)] '
            RETURN

END IF

ELSE                      ! HISTOGRAM IS NOT BIMODAL .......

SLOPE=(CUMDF(NSF(3))-CUMDF(NEF(2)))/(NSF(3)-NEF(2))
        SLOPE=SLOPE*10000.
        WRITE(L3,*)' --->> (2-3)SLOPE= ',SLOPE,'THRESH= ',THRESH

IF(SLOPE.GT.THRESH) THEN   ! 2ND--3RD CLUSTER SLOPE > THRESH
                                    ! 3RD CLUSTER POSSIBLY CONTAINS
                                    ! ANATOMY

C------TAIL PROCESSING ??????

PTAIL=CUMDF(CVMAX1)-CUMDF(NEF(3))
        PTAIL=PTAIL*100.
        WRITE(L3,*) ' TAIL PERCENTAGE = ',PTAIL
        IF(PTAIL.GT.PER_T) THEN    ! TAIL BEYOND TOLERANCE

C------BEGIN TAIL PROCESSING..................

PER_1=CUMDF(CVMAX1)-PER_TCLIP
        DO 40 I=NEF(3),CVMAX1
        IF(CUMDF(I).GE.PER_1) THEN
        TAIL_1=I
                                   ! THE VALUE BEYOND WHICH
                                   ! THE CODE VALUES WILL BE
                                   ! CLIPPED WHEN GAIN IS SET..
                                   ! THE LAST PER_TAIL% OF THE TAIL
                                   ! STARTS AT TAIL_1

WRITE(L3,*) ' CV_START OF',
     +  PER_TCLIP,' % TAIL',TAIL_1
        GO TO 45
        END IF

40          CONTINUE
C-------END OF TAIL PROCESSING..................
45          G=FLOATJ(MANCON)/FLOATJ(TAIL_1)
            WRITE(L3,*) ' G= ',G
C---------------------RULE
                     WRITE(L3,*)' RULE A[(2.2.2.a.1)] '
            RETURN
```

```
              ELSE
                  G=FLOATJ(MANCON)/FLOATJ(NEF(3))
                  WRITE(L3,*) ' G= ',G
C-----------------------RULE
                  WRITE(L3,*)' RULE A[(2.2.2.a.2)] '
              RETURN

END IF

ELSE              ! 2ND--3RD CLUSTER SLOPE < THRESH........

! NOW CHECK 1ST--2ND CLUSTER SLOPE ..
              SLOPE=(CUMDF(NSF(2))-CUMDF(NEF(1)))/(NSF(2)-NEF(1))
              SLOPE=SLOPE*10000.
              WRITE(L3,*)' --->> (1-2)SLOPE= ',SLOPE,'THRESH= ',THRESH
              IF(SLOPE.GT.THRESH) THEN
                                  ! 1ST-2ND CLUSTER SLOPE > THRESH...
                                  ! DETERMINE APPROPRIATE K1 AND K2..

IF(SLOPE.LT.0.4) K1=0.5
                  IF((SLOPE.GE.0.4).AND.(SLOPE.LT.0.5)) K1=0.4
                  IF((SLOPE.GE.0.5).AND.(SLOPE.LT.0.6)) K1=0.3
                  IF((SLOPE.GE.0.6).AND.(SLOPE.LT.1.0)) K1=0.2
                  IF(SLOPE.GE.1.00) K1=0.1
                  K2=1.- K1

CCVX= K1*NEF(2) + K2*NSF(3)
                  G=FLOATJ(MANCON)/CCVX
                  IF(G.LT.1.0) G=1.0       ! IF NEF(KOUNT)>MANCON ~ G=1.0
                  WRITE(L3,*) ' G= ',G
C-----------------------RULE
                  WRITE(L3,*)' RULE A[(2.2.2.b.a)] '
              RETURN

ELSE            ! 1ST--2ND CLUSTER SLOPE < THRESH........
                              ! 2ND CLUSTER MAY CONTAIN ANATOMY

D21=NSF(2)-NEF(1)
                  D23=NSF(3)-NEF(2)
                  IF(D23.LE.D21) THEN    ! 2ND CLUSTER CLOSER TO 3RD..
                                         ! ==> 2ND CLUSTER IS ALSO BACKGROUND..

!DETERMINE APPROPRIATE K1 AND K2..

IF(SLOPE.LT.0.4) K1=0.5
                  IF((SLOPE.GE.0.4).AND.(SLOPE.LT.0.5)) K1=0.4
                  IF((SLOPE.GE.0.5).AND.(SLOPE.LT.0.6)) K1=0.3
                  IF((SLOPE.GE.0.6).AND.(SLOPE.LT.1.0)) K1=0.2
                  IF(SLOPE.GE.1.00) K1=0.1
                  K2=1.- K1

CCVX= K1*NEF(1) + K2*NSF(2)
                  G=FLOATJ(MANCON)/CCVX
                  IF(G.LT.1.0) G=1.0       ! IF NEF(KOUNT)>MANCON ~ G=1.0
                  WRITE(L3,*) ' G= ',G
C-----------------------RULE
                  WRITE(L3,*)' RULE A[(2.2.2.b.b.1)] '
              RETURN
              ELSE                   ! 2ND CLUSTER CLOSER TO 1ST
                                     ! ==> 2nd CLUSTER MAY CONTAIN ANATOMY
                  G=FLOATJ(MANCON)/FLOATJ(NSF(3))
                  IF(G.LT.1.0) G=1.0       ! IF NEF(KOUNT)>MANCON ~ G=1.0
                  WRITE(L3,*) ' G= ',G
C-----------------------RULE
                  WRITE(L3,*)' RULE A[(2.2.2.b.b.2)] '
              END IF

END IF

END IF

END IF
```

```
      RETURN
      END
C-----------------------------------------------------------------C
             SUBROUTINE HISMAX(NLOW,NUP,MAXH,MAXHC)
C-----------------------------------------------------------------C
C                                                                 C
C       Purpose: Determine the global maximum of the histogram    C
C                (MAXH)  for code values in [ NLOW,NUP ]. The code C
C                value at the  maximum is MAXHC.                  C
C                                                                 C
C       Author : M. Ibrahim Sezan                                 C
C                Research Laboratories, Eastman Kodak Company     C
C                October 14, 1985                                 C
C                                                                 C
C Modifications: None                                             C
C-----------------------------------------------------------------C C       Common Variables REAL*4          CIN(10000)
        REAL*4          COUT(0:4095)
        REAL*4          CSM(10000)
        REAL*4          CUMDF(0:4095)
        INTEGER*4       IHIS(0:4095)

C       Input variables

INTEGER*4       NLOW
        INTEGER*4       NUP

C       Output variables

INTEGER*4       MAXH
        INTEGER*4       MAXHC

COMMON/CDF/CIN,CSM,COUT,CUMDF,IHIS

MAXH=-1

DO 10 I=NLOW,NUP

IF(IHIS(I).GT.MAXH) THEN

MAXH=IHIS(I)
            MAXHC=I

END IF

10      CONTINUE

RETURN
        END
        COMMON/PEAK/NS,NE,NSTOP,CVMAX1,JJ,KCOUNT
        COMMON/CDF/CIN,CSM,COUT,CUMDF,IHIS
        COMMON/ORDER/NSF,NEF,KOUNT,FCMOD
        COMMON/DATA/N,NT,F,L2,L3,NM1,NP12,NTT

10      DO 20 I=MAXHC,CVMAX1

IF(IHIS(I).LE.NSV)   THEN

NCOD=I
```

```
                SFLAG=1.0
                GO TO 30

END IF

20      CONTINUE

30      IF(SFLAG.NE.1.0) THEN              ! SUCCESS FLAG IS NOT UP !

NSV=JIFIX(FCMOD*FLOATJ(NSV))   ! MODIFY NSV BY A FACTOR OF "FCMOD"
            WRITE(L3,100) FCMOD
100         FORMAT(/,2X,' "PPER" MODIFICATION BY A FACTOR OF',F,/)

GO TO 10                       ! RESTART SEARCH

END IF

RETURN
        END
C----------------------------------------------------------------------C
C                                                                      C
C                        SUBROUTINE HSRCH                              C
C----------------------------------------------------------------------C
C                                                                      C
C              SUBROUTINE HSRCH(NSV,MAXHC,NCOD)                        C
C----------------------------------------------------------------------C
C                                                                      C
C       Purpose : Search for the code value NCOD where the histogram   C
C                 attains PPER percent of the value MAXH or less.      C
C                 NSV is the value that is sought. If the search fails C
C                 NSV is modified (scaled) by a factor of FCMOD.       C
C                                                                      C
C                                                                      C
C       Author  : M.Ibrahim Sezan                                      C
C                 Research Laboratories, Eastman Kodak Company         C
C                 October 14,1985                                      C
C                                                                      C
C----------------------------------------------------------------------C
C       Common Variables REAL*4          CIN(10000)
            REAL*4          COUT(0:4095)
            REAL*4          CSM(10000)
            REAL*4          CUMDF(0:4095)
            INTEGER*4       CVMAX1
            INTEGER*4       F
            REAL*4          FCMOD
            INTEGER*4       IHIS(0:4095)
            INTEGER*4       JJ
            INTEGER*4       KCOUNT(2)
            INTEGER*4       KOUNT
            INTEGER*4       L2
            INTEGER*4       L3
            INTEGER*4       N
            INTEGER*4       NE(500,2)
            INTEGER*4       NEF(500)
            INTEGER*4       NM1
            INTEGER*4       NP12
            INTEGER*4       NS(500,2)
            INTEGER*4       NSF(500)
            INTEGER*4       NSTOP
            INTEGER*4       NT
            INTEGER*4       NTT C       Input Variables
            INTEGER*4       NSV
            INTEGER*4       MAXHC C       Output Variables

INTEGER*4       NCOD
```

We claim:

1. A method of adjusting final scan gain to produce a final image in a storage phosphor radiography system, comprising the steps of: preliminarily reading out an exposed storage phosphor by stimulating the storage phosphor with a lower intensity stimulation to produce a preliminary image signal, obtaining a histogram of the preliminary image signal, finally reading out said exposed storage phosphor by stimulating said storage phosphor with a higher intensity stimulation based on the histogram to produce a final image signal, and in a digital computer, a. generating a histogram from the results of the preliminary read-out;
　b. detecting peaks and/or clusters of peaks $A_1$ and $A_2$ in the histogram;
　c. determining one major set of peaks or clusters, A, representing structures of interest; and
　d. determining a gain factor g that will locate the major set of peaks at desired gray level locations in the final image based on a set of exam dependent rules and image recording conditions.

2. The method claimed in claim 1, wherein said finally reading out step includes using a laser for conducting final scan stimulation of the storage phosphor, detecting a final image signal with a photomultiplier tube, and amplifying the final image signal by means of a variable gain amplifier, and further comprising the step of:

employing system parameters including pre-scan gain, laser power, photomultiplier tube setting, and the gain factor g to compute an electronic gain factor $g_f$ which is applied to the variable gain amplifier.

3. The method claimed in claim 1, wherein the steps of detecting peaks and/or clusters of peaks comprises the steps of:

a. forming a cumulative distribution function (CDF) from the histogram;
　b. smoothing the cumulative distribution function with a sliding window average of size $N_1$, to produce a smoothed cumulative distribution function;
　c. subtracting the smoothed cumulative distribution function from the cumulative distribution function to produce a peak detection function;
　d. employing the peak detection function to locate a set of peaks, $A_1$ in the histogram by
　　1). identifying positive to negative zero crossings of the peak detection function as the start of a detected peak and
　　2). identifying a maximum following such a positive to negative zero crossing as the end of a detected histogram peak; and
　e. repeating steps a–c with a window of size $N_2$ where $N_1 > N_2$ to locate a second set of peaks $A_2$.

4. The method claimed in claim 3 wherein the step of determining one major set of peaks, A, is performed according to the following rules:

R1. an $A_1$-peak qualifies for the set A if
　　(i) it is an independent peak, or
　　(ii) it is not an independent peak but the total number of the significant overlaps is less than t, where t is an empirically predetermined parameter. (If an $A_2$ peak overlaps significantly with an $A_1$-peak then the overlap is said to be a 'major overlap' if the ratio of the number of pixels contained in the overlap to the total number of pixels contained in the $A_1$-peak exceeds the value $R_{maj}$); and R2. an $A_2$-peak qualifies for the set A if
　　(i) it is an independent peak, or
　　(ii) it is not independent, but its overlap with the $A_1$-peak is a major overlap and the total number of $A_2$-peaks that have major overlaps with the $A_1$ peak is at least t, or
　　(iii) it is not independent and its overlap with the $A_1$-peak is not a major one, but there exist at least t other $A_2$-peaks with major overlaps with that $A_1$-peak, in which case, adjacent peaks that do not have major overlaps with the $A_1$-peak are combined into single peaks.

5. The method claimed in claim 1, wherein the sets of exam dependent rules include a set of rules for chest exams comprising the following rules:

a. IF the histogram is unimodal, THEN the gain is set such that $e_1$ is mapped to gray level (or code value) $Q_c^u$: $g = Q_c^u / e_1$ wherein, the superscript denotes the modality of the histogram and the subscript denotes the exam category of chest exam;
　b. IF the histogram is not unimodal, THEN
　　(1). IF at least a predetermined percentage, P2%, of the total number of pixels attain values in the interval $[e_2, q_{max}-1]$ (where $q_{max}$ denotes the largest gray level present in the pre-scan image), THEN the gain is determined by the following rule: First, the local maximum of the histogram in the interval $[s_2, e_2]$ is determined, let $m_2$ denote the code value at which the local maximum occurs, then the interval $[m_2, q_{max}-1]$ is searched for the smallest code value at which the histogram attains a value less than or equal to $K1 h(m_2)$ ($K1 < 1$ is a predetermined coefficient),
　　(2). IF the percentage of pixels that attain values in the interval $[e_2, q_{max}-1]$ is greater than or equal to a predetermined percentage, P1, but smaller than P2 THEN the previous rule is used with $K2 h(m_2)$ ($K1 < K2 < 1$ is a predetermined coefficient),
　　(3). IF the percentage of pixels that attain values in the interval $[e_2, q_{max}-1]$ is less than P1 THEN
　　　(a). IF the x-rays are not collimated
　　　　i. IF the histogram is bimodal, THEN
　　　　　((1)). IF the percentage of the total number of pixels that attain the value $q_{max}$ is less than or equal to $P_c$%, THEN,
　　　　　　((a)). IF the slope of the CDF between $e_1$ and $s_2$ is greater than the predetermined threshold $S_c$, THEN the gain is set such that $s_2$ is mapped to code value $Q_c$: $g = Q_c / s_2$,
　　　　　　((b)). IF the slope of the CDF computed between $e_1$ and $s_2$ is less than or equal to the predetermined threshold $S_c$, THEN the gain is set such that a code value between $e_1$ and $s_2$, determined from a convex combination of $e_1$ and $s_2$, i.e., $(L_c) e_1 + (1 - L_c) s_2$, is mapped to code value $Q_c$,
　　　　　((2)). IF the percentage of the total number of pixels that attain the value $q_{max}$ is greater than $P_c$%, THEN the gain is set such that $e_2$ is mapped to code value $Q_c$: $g = Q_c / e_2$,
　　　　ii. IF the histogram is not bimodal, THEN the gain is set such that $e_2$ is mapped to code value $Q_c$: $g = Q_c / e_2$,
　　　(b). IF the x-rays are collimated, THEN the gain is set as in b.(1).

6. The method claimed in claim 1, wherein the sets of exam dependent rules include a set of rules for extremity exams comprising the following rules:

a. IF the histogram is unimodal, THEN,
1). IF the x-rays are not collimated, THEN the gain is set as $g = Q_e^u/e_1$ provided that not more than $P_e\%$ of the pixels are mapped to the maximum code value of the system (e.g. 4095 in a 12-bits/pixel system) in the final output, ELSE the gain is set such that $g = Q_e^u/e$ where e ($e < e_1$) is determined such that 1% of the pixels are mapped to the maximum code value of the system in the final output, where the superscript denotes the modality of the histogram and the subscript denotes the exam category of extremity,
2). IF the x-rays are collimated, THEN the gain is set such that $e_1$ is mapped to code value $Q_e^{u,c}$; $g = Q_e^{u,c}/e_1$, where the superscript c reflects the fact that the x-rays are collimated, b. IF the histogram is not unimodal, THEN
1). IF the x-rays are not collimated,
(a). IF the histogram is bimodal, THEN
i. IF the slope of the CDF computed between $e_1$ and $s_2$ is greater than the predetermined threshold $S_3$, THEN the gain is set as $g = Q_e/e_2$ provided that not more than $P_e\%$ of the pixels are mapped to the maximum code value of the system (e.g. 4095 in a 12-bits/pixel system) in the final output, ELSE the gain is set such that $g = Q_e/e$ where e ($e < e_2$) is determined such that 1% of the pixels are mapped to the maximum code value of the system in the final output,
ii. IF the slope of the CDF computed between $e_1$ and $s_2$ is less than or equal to the predetermined threshold $S_e$, THEN the gain is set such that a code value between $e_1$ and $s_2$, determined from a convex combination of $e_1$ and $s_2$, i.e., $(L_e)e_1 + (1 - L_e)s_2$, is mapped to code value $Q_e$,
(b). IF the histogram has more than two clusters, THEN
i. IF the slope of the CDF computed between $e_2$ and $s_3$ is greater than the predetermined threshold $S_e$, THEN the gain is set as $g = Q_e/e_3$ provided that not more than $P_e\%$ of the pixels lie in $[e_3, q_{max}-1]$, ELSE the gain is set such that the percentage of the pixels that are mapped to the maximum code value of the system in the final output is 1%,
ii. IF the slope of the CDF computed between $e_2$ and $s_3$ is less than or equal to the predetermined threshold $S_e$, THEN
((a)). IF the slope of the CDF computed between $e_1$ and $s_2$ is greater than the predetermined threshold $S_e$, THEN the gain is set such that a code value between $e_2$ and $s_3$, determined from a convex combination of $e_2$ and $s_3$, i.e., $(L_e)e_2 + (1 - L_e)s_3$, is mapped to code value $Q_e$,
((b)). IF the slope of the CDF computed between $e_1$ and $s_2$ is less than or equal to the predetermined threshold $S_e$, and the second cluster is closer to the third, THEN
((1)). IF the histogram has three clusters, THEN the gain is set such that a code value between $e_1$ and $s_2$, determined from a convex combination of $e_1$ and $s_2$, i.e., $(L_e)e_1 + (1 - L_e)s_2$, is mapped to code value $Q_e$,
((2)). IF the histogram has four clusters, THEN the gain is set such that $s_3$ is mapped to $Q_e$: $g = Q_e/s_3$,
((3)). IF the histogram has more than four cluster, THEN the gain is set such that $e_3$ is mapped to $Q_e$: $g = Q_e/e_3$,
((c)). IF the slope of the CDF computed between $e_1$ and $s_2$ is less than or equal to the predetermined threshold $S_e$, but the second cluster is closer to the first, THEN the gain is set such that a code value between $e_2$ and $s_3$, determined from a convex combination of $e_2$ and $s_3$, $(L_e)e_2 + (1 - L_e)s_3$, is mapped to code value $Q_e$,
2). IF the x-rays are collimated, THEN the gain is set such that the end point of the last cluster is mapped to code value $Q_e^c$, where the superscript c reflects the fact that the x-rays are collimated.

7. The method claimed in claim 1, wherein the sets of exam dependent rules include a set of rules for abdomen exams, comprising the following rules:

a. IF the histogram is unimodal, THEN
1). The gain is set as $g = Q_a^u/e_1$ provided that not more than $P_a\%$ and not less than 0.5% of the pixels are mapped to the maximum code value of the system in the final output, ELSE the gain is set such that $g = Q_a^u/e$ where e is determined such that 0.5% of the pixels are mapped to the maximum code value of the system in the final output, where the superscript denotes the modality of the histogram, and the subscript denotes the exam category abdomen, and b. IF the histogram is not unimodal, THEN
1). IF the x-rays are not collimated,
(a). IF the histogram is bimodal, THEN
i. IF the slope of the CDF computed between $e_1$ and $s_2$ is greater than the predetermined threshold $S_a$, THEN the gain is set as $g = Q_a^u/e_2$ provided that not more than $P_a\%$ of the pixels are mapped to the maximum code value of the system (e.g. 4095 in a 12-bits/pixel system) in the final output, ELSE the gain is set such that $g = Q_a^u/e$ where e ($e < e_2$) is determined such that 0.5% of the pixels are mapped to the maximum code value of the system in the final output,
ii. IF the slope of the CDF computed between $e_1$ and $s_2$ is less than or equal to the predetermined threshold $S_a$, THEN the gain is set such that a code value between $e_1$ and $s_2$, determined from a convex combination of $e_1$ and $s_2$, i.e., $(L_a)e_1 + (1 - L_a)s_2$, is mapped to code value $Q_a$,
(b). IF the histogram has more than two clusters, THEN
i. IF the slope of the CDF computed between $e_2$ and $s_3$ is greater than the predetermined threshold $S_a$, THEN the gain is set as $g = Q_a^u/e_3$ provided that not more than $P_a\%$ of the pixels lie in $[e_3, q_{max}-1]$, ELSE the gain in set such that the percentage of the pixels that are mapped to the maximum code value of the system in the final output is 0.5%, ii. IF the slope of the CDF computed between $e_2$ and $s_2$ is greater than equal to the predetermined threshold $S_a$, THEN, ((a)). IF the slope of the CDF computed between $e_1$ and $s_2$ is greater than the predetermined threshold $S_a$, THEN the gain is set such that a code value between $e_2$ and $s_3$, determined from a convex combination of $e_2$ and $s_3$, i.e., $(L_a)e_2 + (1-L_a)s_3$, is mapped to code value $Q_a$, ((b)). IF the slope of the CDF computed between $e_1$ and $s_2$ is less than or equal to the predetermined threshold $S_a$, and the second cluster is closer to the third, THEN the gain is set such that a code value between $e_1$ and $s_2$, determined from a convex combination of $e_1$ and $s_2$, i.e., $(L_a)e_1 + (1-L_a)s_2$, is mapped to code value $Q_a$, ((c)). IF the slope of the CDF computed between $e_2$ and $e_3$ is less than or equal to the predetermined threshold $S_a$, but the second cluster is closer to first, THEN the gain is set as $g = Q_a/e_3$, 2). IF the x-rays are collimated, THEN the gain is set such that the end point of the last cluster is mapped to code value $Q_a{}^c$, where the superscript c reflects the fact that the x-rays are collimated.

8. The method claimed in claim 1, wherein the storage phosphor radiography system includes a quality control station having a display monitor, further comprising the steps of:

a. scaling the preliminary-scan image pixel-by-pixel to produce a quality control image, and b. displaying the quality control image on the monitor prior to final read out of the image.

9. A method of adjusting final scan gain to produce a final image in a storage phosphor radiography system, comprising the steps of: preliminarily reading out a storage phosphor by stimulating the storage phosphor with a lower intensity stimulation to produce a preliminary image signal, obtaining a histogram of the preliminary image signal, finally reading out said storage phosphor by stimulating said storage phosphor with a higher intensity stimulation based on the histogram to produce a final image signal, and comprising the steps of:

a. computing a gain factor g for the final scan stimulation, and b. scaling a preliminary scan image pixel-by-pixel to produce a quality control image signal, and c. displaying the quality control image signal on a monitor prior to conducting the final scan stimulation, whereby an operator viewing the quality control image may order a re-take of the image prior to final read-out in the event that the quality control image is unsatisfactory.

* * * * *